US009003230B2

(12) United States Patent
Kudo et al.

(10) Patent No.: US 9,003,230 B2
(45) Date of Patent: *Apr. 7, 2015

(54) METHOD AND APPARATUS FOR CAUSE ANALYSIS INVOLVING CONFIGURATION CHANGES

(71) Applicant: Hitachi, Ltd., Tokyo (JP)

(72) Inventors: Yutaka Kudo, San Jose, CA (US); Tetsuya Masuishi, San Jose, CA (US); Takahiro Fujita, San Jose, CA (US); Yoshitsugu Ono, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,996

(22) Filed: Nov. 21, 2013

(65) Prior Publication Data
US 2014/0082423 A1   Mar. 20, 2014

Related U.S. Application Data

(63) Continuation of application No. 13/213,512, filed on Aug. 19, 2011, now Pat. No. 8,601,319, which is a continuation of application No. 12/526,383, filed as application No. PCT/IB2009/005640 on Mar. 30, 2009, now Pat. No. 8,024,617.

(51) Int. Cl.
*G06F 11/00* (2006.01)
*G06F 11/07* (2006.01)
*H04L 12/24* (2006.01)

(52) U.S. Cl.
CPC .......... *G06F 11/079* (2013.01); *H04L 41/0813* (2013.01); *H04L 41/0856* (2013.01); *H04L41/0866* (2013.01); *G06F 11/0706* (2013.01); *G06F 11/0751* (2013.01); *H04L 41/0681* (2013.01)

(58) Field of Classification Search
CPC ............ G06F 11/2257; G06F 11/2289; G06F 11/3051; G06F 11/3604; G06F 11/3616
USPC .......... 714/25, 26, 33, 37, 38.1, 38.11, 38.12, 714/38.13, 38.14, 39, 48, 57; 717/120–135, 717/168–173; 709/220, 222; 706/11
See application file for complete search history.

(56) References Cited

U.S. PATENT DOCUMENTS 5,729,744 A   3/1998   Gerken et al.
6,633,782 B1   10/2003   Schleiss et al.
(Continued)

FOREIGN PATENT DOCUMENTS

EP   1 566 734 A   8/2005
EP   1 615 130 A   1/2006

OTHER PUBLICATIONS

IP.com Journal, "Method and Apparatus for automatically configuration problem diagnosis and recovery based on change trace checking and rollback", Oct. 23, 2007, pp. 1-5, XP013122521, ISSN: 1553-0001, IP.com Inc., Henrietta, NY, USA.

*Primary Examiner* — Scott Baderman
*Assistant Examiner* — Joseph Kudirka
(74) *Attorney, Agent, or Firm* — Mattingly & Malur, PC

(57) ABSTRACT

A technique determines which configuration change(s) caused an application invocation failure of a computer application without the need for a knowledge database. To determine which configuration change is the most likely cause, the cause analysis program checks other computers that have experienced the same configuration changes. The cause analysis program checks and counts the application invocation results before and after each configuration change is done. If the same configuration changes are found in the other computers, the program checks whether each configuration change caused or cured the same problem in that computer. The program counts the similar cases for all of the computers. Subsequently, the program calculates the ratio of those instances involving a change from success to failure and the ratio of those instances involving a change from failure to success out of all instances for each configuration change.

6 Claims, 25 Drawing Sheets

(56) References Cited

U.S. PATENT DOCUMENTS

| | | |
|---|---|---|
| 7,539,907 B1 | 5/2009 | Johnsen et al. |
| 7,774,657 B1 * | 8/2010 | Hardman ............... 714/47.1 |
| 7,797,415 B2 * | 9/2010 | Peracha ................ 709/223 |
| 2003/0101261 A1 | 5/2003 | Ikeda et al. |
| 2005/0015667 A1 | 1/2005 | Aaron |
| 2005/0188268 A1 | 8/2005 | Verbowski et al. |
| 2007/0260932 A1 | 11/2007 | Prichard et al. |
| 2008/0109790 A1 | 5/2008 | Farnham et al. |

* cited by examiner

Exemplary Hardware and Logical Configuration for Client-Server Architecture

Functional Relationships in the Information System

Cause Analysis Program User Interface 401

Possible Causal Configuration Changes

| Configuration Item | Change Type | Change Date Time | FAILURE Rate vs. SUCCESS Rate / FAILURE Count vs. SUCCESS Count | |
|---|---|---|---|---|
| PRINTER DRIVER A | ADD | 06/04/2008 08:20:11 | 80.00% 12 | 20.00% 3 |
| VPN-CLIENT v2.0 | ADD | 06/03/2008 14:27:35 | 3.42% 13 | 96.58% 367 |
| VPN-CLIENT v1.8 | REMOVE | 06/02/2008 13:27:35 | 2.89% 11 | 97.11% 370 |
| PATCH-2322 | ADD | 06/04/2008 07:43:11 | 1.78% 15 | 98.22% 830 |

(Certainty: High → Low)

Possible Fixing Configuration Change

| Configuration Item | Change Type | Fixed Rate vs. Not Fixed Rate / Fixed Count vs. Not Fixed Count | |
|---|---|---|---|
| PRINTER DRIVER A | REMOVE | 87.50% 7 | 12.50% 1 |
| PATCH-1234 | ADD | 62.50% 5 | 37.50% 3 |
| MEMORY=1024 | ADD | 16.67% 1 | 83.33% 5 |

(Certainty: High → Low)

Analysis Result User Interface 501

FIG. 5

| Computer ID | Date Time | Event Type | |
|---|---|---|---|
| Comp-001 | 06/05/2008 13:41:19 | Event-001 | 415 |
| Comp-001 | 06/05/2008 13:35:43 | Event-001 | 416 |
| Comp-001 | 06/04/2008 08:29:24 | Event-001 | 417 |
| ... | ... | ... | |
| Comp-002 | 05/02/2008 10:29:25 | Event-001 | 421 |
| Comp-002 | 05/02/2008 07:28:39 | Event-001 | 422 |
| ... | ... | ... | |
| Comp-003 | 05/02/2008 11:29:25 | Event-001 | 431 |
| ... | ... | ... | |
| Comp-006 | 05/02/2008 11:29:25 | Event-001 | 441 |
| ... | ... | ... | |
| Comp-007 | 05/15/2008 13:26:25 | Event-001 | 451 |
| Comp-007 | 05/12/2008 15:23:48 | Event-001 | 452 |
| ... | ... | ... | |

601 = Computer ID, 602 = Date Time, 603 = Event Type

Event Log TBL 141

FIG. 6

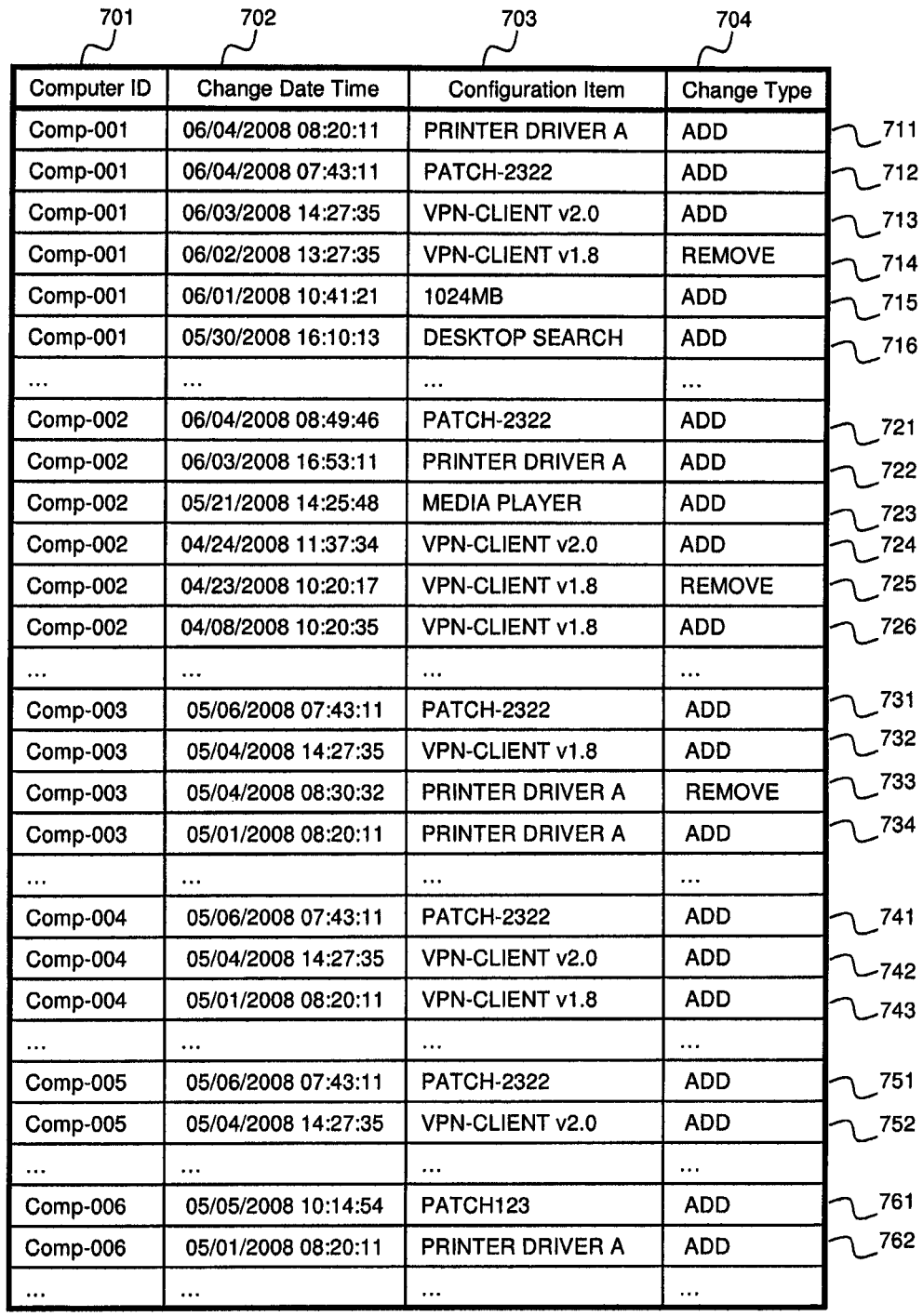

| Computer ID | Change Date Time | Configuration Item | Change Type | |
|---|---|---|---|---|
| Comp-001 | 06/04/2008 08:20:11 | PRINTER DRIVER A | ADD | 711 |
| Comp-001 | 06/04/2008 07:43:11 | PATCH-2322 | ADD | 712 |
| Comp-001 | 06/03/2008 14:27:35 | VPN-CLIENT v2.0 | ADD | 713 |
| Comp-001 | 06/02/2008 13:27:35 | VPN-CLIENT v1.8 | REMOVE | 714 |
| Comp-001 | 06/01/2008 10:41:21 | 1024MB | ADD | 715 |
| Comp-001 | 05/30/2008 16:10:13 | DESKTOP SEARCH | ADD | 716 |
| ... | ... | ... | ... | |
| Comp-002 | 06/04/2008 08:49:46 | PATCH-2322 | ADD | 721 |
| Comp-002 | 06/03/2008 16:53:11 | PRINTER DRIVER A | ADD | 722 |
| Comp-002 | 05/21/2008 14:25:48 | MEDIA PLAYER | ADD | 723 |
| Comp-002 | 04/24/2008 11:37:34 | VPN-CLIENT v2.0 | ADD | 724 |
| Comp-002 | 04/23/2008 10:20:17 | VPN-CLIENT v1.8 | REMOVE | 725 |
| Comp-002 | 04/08/2008 10:20:35 | VPN-CLIENT v1.8 | ADD | 726 |
| ... | ... | ... | ... | |
| Comp-003 | 05/06/2008 07:43:11 | PATCH-2322 | ADD | 731 |
| Comp-003 | 05/04/2008 14:27:35 | VPN-CLIENT v1.8 | ADD | 732 |
| Comp-003 | 05/04/2008 08:30:32 | PRINTER DRIVER A | REMOVE | 733 |
| Comp-003 | 05/01/2008 08:20:11 | PRINTER DRIVER A | ADD | 734 |
| ... | ... | ... | ... | |
| Comp-004 | 05/06/2008 07:43:11 | PATCH-2322 | ADD | 741 |
| Comp-004 | 05/04/2008 14:27:35 | VPN-CLIENT v2.0 | ADD | 742 |
| Comp-004 | 05/01/2008 08:20:11 | VPN-CLIENT v1.8 | ADD | 743 |
| ... | ... | ... | ... | |
| Comp-005 | 05/06/2008 07:43:11 | PATCH-2322 | ADD | 751 |
| Comp-005 | 05/04/2008 14:27:35 | VPN-CLIENT v2.0 | ADD | 752 |
| ... | ... | ... | ... | |
| Comp-006 | 05/05/2008 10:14:54 | PATCH123 | ADD | 761 |
| Comp-006 | 05/01/2008 08:20:11 | PRINTER DRIVER A | ADD | 762 |
| ... | ... | ... | ... | |

Configuration Change History TBL 143

FIG. 7

| Computer ID | Invocation Date Time | Application Name | |
|---|---|---|---|
| ... | ... | ... | |
| Comp-001 | 06/05/2008 13:41:18 | DOC EDITOR | 811 |
| Comp-001 | 06/05/2008 13:35:42 | DOC EDITOR | 812 |
| Comp-001 | 06/04/2008 08:29:23 | DOC EDITOR | 813 |
| Comp-001 | 06/03/2008 12:13:14 | MAILER | 814 |
| Comp-001 | 06/03/2008 12:10:54 | VPN18 | 815 |
| Comp-001 | 06/03/2008 12:03:54 | ANTI-VIRUS | 816 |
| Comp-001 | 06/03/2008 12:03:59 | BACKUP-AGENT | 817 |
| Comp-001 | 06/02/2008 14:26:03 | DOC EDITOR | 818 |
| Comp-001 | 06/02/2008 14:22:47 | MAILER | 819 |
| Comp-001 | 06/02/2008 10:29:23 | DOC EDITOR | 820 |
| ... | ... | ... | |
| Comp-002 | 05/02/2008 10:29:23 | DOC EDITOR | 821 |
| Comp-002 | 05/02/2008 07:27:23 | DOC EDITOR | 822 |
| ... | ... | ... | |
| Comp-003 | 05/06/2008 07:45:23 | DOC EDITOR | 831 |
| Comp-003 | 05/05/2008 10:30:24 | DOC EDITOR | 832 |
| Comp-003 | 05/02/2008 11:29:23 | DOC EDITOR | 833 |
| Comp-003 | 05/01/2008 07:45:23 | DOC EDITOR | 834 |
| Comp-003 | 04/28/2008 10:29:23 | DOC EDITOR | 835 |
| ... | ... | ... | |
| Comp-004 | 05/06/2008 07:45:23 | DOC EDITOR | 841 |
| Comp-004 | 05/02/2008 11:29:23 | DOC EDITOR | 842 |
| Comp-004 | 05/01/2008 07:45:23 | DOC EDITOR | 843 |
| Comp-004 | 04/28/2008 10:29:23 | DOC EDITOR | 844 |
| ... | ... | ... | |
| Comp-005 | 05/06/2008 07:45:23 | DOC EDITOR | 851 |
| ... | ... | ... | |

Application Invocation History TBL 142

FIG. 8

| Computer ID | Change Date Time | Configuration Item | Change Type | Invocation-Before | Invocation-After | |
|---|---|---|---|---|---|---|
| Comp-001 | 06/04/2008 08:20:11 | PRINTER DRIVER A | ADD | SUCCESS | FAILURE | 911 |
| Comp-001 | 06/04/2008 07:43:11 | PATCH-2322 | ADD | SUCCESS | FAILURE | 912 |
| Comp-001 | 06/03/2008 14:27:35 | VPN-CLIENT v2.0 | ADD | SUCCESS | FAILURE | 913 |
| Comp-001 | 06/03/2008 13:59:28 | VPN-CLIENT v1.8 | REMOVE | SUCCESS | FAILURE | 914 |
| ... | ... | ... | ... | ... | ... | |
| Comp-002 | 06/04/2008 08:49:46 | PATCH-2322 | ADD | SUCCESS | FAILURE | 921 |
| Comp-002 | 06/03/2008 16:53:11 | PRINTER DRIVER A | ADD | SUCCESS | FAILURE | 922 |
| Comp-002 | 04/24/2008 11:37:34 | VPN-CLIENT v2.0 | ADD | SUCCESS | SUCCESS | 923 |
| Comp-002 | 04/23/2008 10:20:17 | VPN-CLIENT v1.8 | REMOVE | SUCCESS | SUCCESS | 924 |
| ... | ... | ... | ... | ... | ... | |
| Comp-003 | 05/06/2008 07:43:11 | PATCH-2322 | ADD | SUCCESS | SUCCESS | 931 |
| Comp-003 | 05/01/2008 08:20:11 | PRINTER DRIVER A | ADD | SUCCESS | FAILURE | 932 |
| ... | ... | ... | ... | ... | ... | |
| Comp-004 | 05/06/2008 07:43:11 | PATCH-2322 | ADD | SUCCESS | SUCCESS | 941 |
| Comp-004 | 05/04/2008 14:27:35 | VPN-CLIENT v2.0 | ADD | SUCCESS | SUCCESS | 942 |
| ... | ... | ... | ... | ... | ... | |
| Comp-005 | 05/06/2008 07:43:11 | PATCH-2322 | ADD | UNKNOWN | SUCCESS | 951 |
| Comp-005 | 05/04/2008 14:27:35 | VPN-CLIENT v2.0 | ADD | UNKNOWN | SUCCESS | 952 |
| ... | ... | ... | ... | ... | ... | |
| Comp-006 | 05/01/2008 08:20:11 | PRINTER DRIVER A | ADD | SUCCESS | FAILURE | 961 |
| ... | ... | ... | ... | ... | ... | |
| Comp-007 | 05/11/2008 08:20:11 | PRINTER DRIVER A | ADD | SUCCESS | FAILURE | 971 |
| ... | ... | ... | ... | ... | ... | |

Causal Configuration Changes Temp TBL 144

FIG. 9

| Configuration Item | Change Type | Change Date Time | Num of Failure Cases | Num of All Cases | |
|---|---|---|---|---|---|
| PRINTER DRIVER A | ADD | 06/04/2008 08:20:11 | 12 | 15 | 1011 |
| VPN-CLIENT v2.0 | ADD | 06/03/2008 14:27:35 | 13 | 367 | 1012 |
| VPN-CLIENT v1.8 | REMOVE | 06/03/2008 13:59:28 | 11 | 370 | 1013 |
| PATCH-2322 | ADD | 06/04/2008 07:43:11 | 15 | 830 | 1014 |

Causal Configuration Changes TBL 146

FIG. 10

| Computer ID | Change Date Time | Configuration Item | Change Type | Invocation-Before | Invocation-After | |
|---|---|---|---|---|---|---|
| Comp-001 | 06/04/2008 08:20:11 | PRINTER DRIVER A | ADD | SUCCESS | FAILURE | 1111 |
| Comp-001 | 06/04/2008 07:43:11 | PATCH-2322 | ADD | SUCCESS | FAILURE | 1112 |
| Comp-001 | 06/03/2008 14:27:35 | VPN-CLIENT v2.0 | ADD | SUCCESS | FAILURE | 1113 |
| ... | ... | ... | ... | ... | ... | |
| Comp-002 | 06/04/2008 8:49:46 | PATCH-2322 | ADD | SUCCESS | FAILURE | 1121 |
| ... | ... | ... | ... | ... | ... | |
| Comp-003 | 05/04/2008 08:30:32 | PRINTER DRIVER A | REMOVE | FAILURE | SUCCESS | 1131 |
| ... | ... | ... | ... | ... | ... | |
| Comp-006 | 05/05/2008 10:14:54 | PATCH-123 | ADD | FAILURE | SUCCESS | 1141 |
| ... | ... | ... | ... | ... | ... | |

Fixing Conf. Changes Temp TBL 145

FIG. 11

| Configuration Item | Change Type | Num of Fixing Cases | Num of All Cases | |
|---|---|---|---|---|
| PRINTER DRIVER A | REMOVE | 29 | 33 | 1211 |
| PATCH-1234 | ADD | 4 | 10 | 1212 |
| MEMORY=2048 | ADD | 1 | 9 | 1213 |

Fixing Conf. Change TBL 147

FIG. 12

| | | 2101 | 2102 | 1001 | 1002 | 1003 | 1004 | 1005 |
|---|---|---|---|---|---|---|---|---|
| | | Application Name | Analyzed Date Time | Configuration Item | Change Type | Change Date Time | Num of Failure Cases | Num of All Cases |
| 2111 | | DOC EDITOR | 06/05/2008 14:20:12 | PRINTER DRIVER A | ADD | 06/04/2008 08:20:11 | 12 | 15 |
| | | | | VPN-CLIENT v2.0 | ADD | 06/03/2008 14:27:35 | 13 | 367 |
| | | | | VPN-CLIENT v1.8 | REMOVE | 06/03/2008 13:59:28 | 11 | 370 |
| | | | | PATCH-2322 | ADD | 06/04/2008 07:43:11 | 15 | 830 |
| | | WEB BROWSER | 06/05/2008 14:20:12 | ... | ... | ... | ... | ... |
| | | | | ... | ... | ... | ... | ... |
| | | | | ... | ... | ... | ... | ... |
| | | ... | ... | ... | ... | ... | ... | ... |

Causal Configuration Changes TBL 146-21

FIG. 21

| Combin ation ID | Configuration Item | Change Type | Change Date Time | Num of Failure Cases | Num of All Cases |
|---|---|---|---|---|---|
| 001 | PRINTER DRIVER A | ADD | 06/04/2008 08:20:11 | 45 | 90 |
| | VPN-CLIENT v2.0 | ADD | 06/03/2008 14:27:35 | | |
| | VPN-CLIENT v1.8 | REMOVE | 06/03/2008 13:59:28 | | |
| 002 | PRINTER DRIVER A | ADD | 06/04/2008 08:20:11 | 5 | 8 |
| | VPN-CLIENT v2.0 | ADD | 06/03/2008 14:27:35 | | |
| 003 | VPN-CLIENT v2.0 | ADD | 06/03/2008 14:27:35 | 50 | 300 |
| | VPN-CLIENT v1.8 | REMOVE | 06/03/2008 13:59:28 | | |
| 004 | PRINTER DRIVER A | ADD | 06/04/2008 08:20:11 | 1 | 2 |
| | VPN-CLIENT v1.8 | REMOVE | 06/03/2008 13:59:28 | | |
| 005 | PRINTER DRIVER A | ADD | 06/04/2008 08:20:11 | 6 | 9 |
| 006 | VPN-CLIENT v2.0 | ADD | 06/03/2008 14:27:35 | 5 | 455 |
| 007 | VPN-CLIENT v1.8 | REMOVE | 06/03/2008 13:59:28 | 22 | 58 |

Causal Configuration Changes TBL 146-23

FIG. 23

Exemplary Hardware and Logical Configuration for Peer-to-Peer Architecture

METHOD AND APPARATUS FOR CAUSE ANALYSIS INVOLVING CONFIGURATION CHANGES

This application is a continuation of U.S. patent application Ser. No. 13/213,512, filed Aug. 19, 2011, now U.S. Pat. No. 8,601,319, which is a continuation of U.S. application Ser. No. 12/526,383, filed Aug. 7, 2009, now U.S. Pat. No. 8,024,617, which is a 371 of International Application No. PCT/IB2009/005640, filed Mar. 30, 2009, the disclosures of which are incorporated herein by reference.

BACKGROUND OF THE INVENTION

The present invention relates generally to causal analysis in computers and, more particularly, cause analysis involving configuration changes for finding a solution to an application failure by analyzing configuration changes without using a knowledge database.

One of the most stressful jobs for administrators of the desktop computing environment is the cause analysis in the case where trouble occurs (trouble shooting). The causal analysis is also critical for the helpdesk person who needs to provide the solution to the caller. End users tend to install many kinds of software or change OS settings that might cause the problems. Furthermore, because a number of automatic upgrade programs routinely run in the end user computer, the configuration of the computer can be changed without the end user's awareness. Thus, the end user does not know when the configuration became faulty and may not remember when the problem began. Administrators or helpdesk persons for such kind of desktop computing environment need to know the background of the trouble deeply with their expertise in order to provide a solution to the end user.

Current solutions involve, for example, technology to view the event log in the computer remotely, technology to collect and store the configuration items and their change history, technology to detect the application invocation and store their invocation history, technology to store the knowledge in the past solution, and technology to deduce the root cause by combining the above mentioned information.

JP P2007-29339A for "System, Method and Program for Fault Monitoring" is an example of deducing the root cause by the event log, configuration change, and knowledge database. Paragraph 0134 discloses collecting the time series data of error log, event information, and configuration change from target monitoring computers. Paragraph 0137 and FIGS. 16, 17, and 18 disclose comparing error situation on target computer with that in the past data.

Examples of collecting the event log remotely include U.S. Pat. No. 6,289,379 for "Method for Monitoring Abnormal Behavior in a Computer System," and U.S. Pat. No. 5,857,190 for "Event Logging System and Method for Logging Events in a Network System." U.S. Pat. No. 6,012,152 for "Event Software Fault Management System" is an example of fault analysis using knowledge base. U.S. Pat. No. 6,598,179 for "Table-Based Error Log Analysis" is an example of fault analysis using error log. U.S. Pat. App. Pub. No. 2007/0214193 A1 for "Change Monitoring Program for Computer Resource on Network" is an example of getting configuration changes remotely.

The administrator or help desk person needs a kind of knowledge to provide a solution by reviewing the event log, configuration change history, application invocation history, or the like. The knowledge can be obtained from a knowledge database which presents "Cause" and "Solution" written by someone. Because someone needs to maintain the knowledge database up to date, it requires a maintenance cost.

BRIEF SUMMARY OF THE INVENTION

Exemplary embodiments of the invention provide a technique to determine which configuration changes caused the problem without the need for a knowledge database. Therefore, this invention does not provide the root cause but the "final straw" that needs to be removed (i.e., the final answer). The invention provides a direct way to address the problem that is solution-oriented rather than "root cause"-oriented.

The end user makes an inquiry. The help desk starts analyzing. The first step is to detect the target period. For target period detection, a cause analysis program detects the last success of application invocation and the first failure of application invocation based on both the event log and the application invocation history. For configuration change detection, the configuration changes are determined by combining the configuration change history with the results of the target period detection. These configuration changes might affect the application invocation. One of these configuration changes will be the final straw. The next step is to check other computers. To determine which configuration change is the most likely cause, the cause analysis program checks other computers that have experienced the same configuration changes. The cause analysis program checks and counts the application invocation results before and after each configuration change is done. If the same configuration changes are found in the other computers, the program checks whether each configuration change caused or cured the same problem in that computer. The program counts the similar cases for all of the computers. Subsequently, the program calculates the ratio of those instances involving a change from success to failure and the ratio of those instances involving a change from failure to success out of all instances for each configuration change. The cause analysis program then displays the result. The result of the analysis is shown in the form of ranking with charts. The help desk can answer the question as to which configuration change is the most susceptible.

This invention does not use any knowledge database written by humans. It does not seek to find the root cause, because even if the user knew the root cause, the user might not know how to fix it easily. Instead, the invention identifies the final straw. What the user should do is to remove the final straw. It is more effective for the user to fix the problem than to be told what the root cause is.

An aspect of the present invention is directed to a method of cause analysis for a target computer of a plurality of computers, the target computer having experienced an application invocation failure of a computer application at a first failure time and an application invocation success of the computer application at a first success time prior to the first failure time, without any other application invocation success and without any other application invocation failure of the computer application in a first time period between the first success time and the first failure time (see, e.g., FIG. 14). The method comprises (1) identifying one or more first configuration changes that occurred during the first time period of the computer application; and (2) performing at least one of causal configuration change analysis (A) or fixing configuration change analysis (B). The analysis (A) includes, for every other computer of the plurality of computers other than the target computer, identifying other application invocation failure instances in which said every other computer has experienced an application invocation success of the same computer application at a second success time and an application invocation failure of the same computer application at a second failure time after the second success time, without any other application invocation success and without any other application invocation failure of the same computer application in a second time period between the second success time and the second failure time, and identifying one or more second configuration changes that occurred during the second time period, and obtaining a total causal configuration change count for each of the one or more second configuration changes by summing for all the plurality of computers other than the target computer (see, e.g., FIG. 17). The analysis (B) includes, for every other computer of the plurality of computers other than the target computer, identifying application invocation success instances in which said every other computer has experienced an application invocation failure of the same computer application at a third failure time and an application invocation success of the same computer application at a third success time after the third failure time, without any other application invocation success and without any other application invocation failure of the same computer application in a third time period between the third failure time and the third success time, and identifying one or more third configuration changes that occurred during the third time period, and obtaining a total fixing configuration change count for each of the one or more third configuration changes by summing for all the plurality of computers other than the target computer (see, e.g., FIG. 19).

Another aspect of the invention is directed to a system of cause analysis which has a plurality of computers including a target computer, and an analysis computer connected with the plurality of computers. The analysis computer is programmed to perform steps (1) and (2) above. In some embodiments, the analysis computer is one of the plurality of computers (see, e.g., FIG. 25).

Another aspect of the invention is directed to a computer-readable storage medium storing a plurality of instructions for controlling a data processor to perform steps (1) and (2) above.

In some embodiments, the method further comprises, presenting results for at least one of causal configuration change results (A1) or fixing configuration change results (B1). In step (A1), the method comprises, for each of the one or more second configuration changes, listing a number of application failure invocation instances identified for said every other computer, and a number of all instances involving each of the one or more second configuration changes for said every other computer (see, e.g., FIG. 10). In step (B1), the method comprises, for each of the one or more third configuration changes, listing a number of application success invocation instances identified for said every other computer, and a number of all instances involving each of the one or more third configuration changes for said every other computer (see, e.g., FIG. 12).

In some embodiments, steps (1) and (2) are carried out for a plurality of computer applications. The method further comprises, for each of the plurality of computer applications, presenting results for at least one of causal configuration change results (A2) or fixing configuration change results (B2). In step (A2), the method comprises, for each of the one or more second configuration changes, listing a number of application failure invocation instances identified for said every other computer, and a number of all instances involving each of the one or more second configuration changes for said every other computer, and listing an analyzed date and time for each of the plurality of computer applications (see, e.g., FIG. 21). In step (B2), the method comprises, for each of the one or more third configuration changes, listing a number of application success invocation instances identified for said every other computer, and a number of all instances involving each of the one or more third configuration changes for said every other computer, and listing an analyzed date and time for each of the plurality of computer applications.

In specific embodiments, the method further comprises, for a specified computer application, performing at least one of a matching causal configuration change analysis (A3) or a matching fixing configuration change analysis (B3). In step (A3), the method includes searching the results of (A2) for a computer application that matches the specified computer application as matching causal configuration change results, and retrieving the matching causal configuration change results for analysis (see, e.g., FIG. 22). In step (B3), the method includes searching the results of (B2) for a computer application that matches the specified computer application as matching fixing configuration change results, and retrieving the matching fixing configuration change results for analysis.

In some embodiments, the method further comprises performing at least one of a combination causal configuration change analysis (C) or a combination fixing configuration change analysis (D). In step (C), the method comprises, for every other computer of the plurality of computers other than the target computer, identifying other application invocation failure instances in which said every other computer has experienced an application invocation success of the same computer application at a fourth success time and an application invocation failure of the same computer application at a fourth failure time after the fourth success time, without any other application invocation success and without any other application invocation failure of the same computer application in a fourth time period between the fourth success time and the fourth failure time, and identifying one or more combinations of fourth configuration changes that occurred during the fourth time period, and obtaining a total causal configuration change count for each of the combinations of fourth configuration changes by summing for all the plurality of computers other than the target computer (see, e.g., FIG. 24). In step (D), the method comprises, for every other computer of the plurality of computers other than the target computer, identifying application invocation success instances in which said every other computer has experienced an application invocation failure of the same computer application at a fifth failure time and an application invocation success of the same computer application at a fifth success time after the fifth failure time, without any other application invocation success and without any other application invocation failure of the same computer application in a fifth time period between the fifth failure time and the fifth success time, and identifying one or more combinations of fifth configuration changes that occurred during the fifth time period, and obtaining a total fixing configuration change count for each of the one or more fifth configuration changes by summing for all the plurality of computers other than the target computer.

In some embodiments, the method further comprises presenting results for at least one of combination causal configuration change results (C1) or combination fixing configuration change results (D1). In step (C1), the method includes, for each of the one or more combinations of fourth configuration changes, listing a number of application failure invocation instances identified for said every other computer, and a number of all instances involving each of the one or more combinations of fourth configuration changes for said every other computer. In step (D1), the method includes, for each of the one or more combinations of fifth configuration changes, listing a number of application success invocation instances identified for said every other computer, and a number of all instances involving each of the one or more combinations of fifth configuration changes for said every other computer.

Another aspect of the invention is directed to a method in a computer system for performing a cause analysis for a target computer of a plurality of computers, the target computer having experienced an application invocation failure of a computer application at a first failure time and an application invocation success of the computer application at a first success time prior to the first failure time, without any other application invocation success and without any other application invocation failure of the computer application in a first time period between the first success time and the first failure time. The method comprises presenting a causal configuration changes table listing one or more first configuration changes that occurred during the first time period of the computer application; and a graphical chart corresponding to each first configuration change of the one or more first configuration changes, the graphical chart having a failure rate area and a success rate area. The failure rate area shows a representation of failure cases of identifying, for every other computer of the plurality of computers other than the target computer, other application invocation failure instances in which said every other computer has experienced an application invocation success of the same computer application at a second success time and an application invocation failure of the same computer application at a second failure time after the second success time, without any other application invocation success and without any other application invocation failure of the same computer application in a second time period between the second success time and the second failure time. A second configuration change identical to the corresponding first configuration change listed on the table occurred during the second time period. The success rate area shows a representation of success cases of identifying, for every other computer of the plurality of computers other than the target computer, no other application invocation failure instances in which said every other computer has experienced an application invocation success of the same computer application at a third success time and an application invocation failure of the same computer application at a third failure time after the third success time, without any other application invocation success and without any other application invocation failure of the same computer application in a third time period between the third success time and the third failure time. A third configuration change identical to the corresponding first configuration change listed on the table occurred during the third time period.

In some embodiments, the graphical chart comprises a graphical bar chart, the failure rate area shows at least one of a number of the failure cases or a percentage of the failure cases as compared to a total number of both the failure cases and the success cases, and the failure success area shows at least one of a number of the success cases or a percentage of the success cases as compared to the total number of both the failure cases and the success cases. The causal configuration changes table lists a configuration item and a change type of the one or more first configuration changes, a change date and time corresponding to the one or more first configuration changes, and the graphical chart showing the failure rate area and the success rate area. The method further comprises presenting a sorting key indicator to a user for sorting the causal configuration changes table according to any one of the configuration item, change type, change date and time, and the failure rate of the graphical chart; and, in response to an input selection of the sorting key indicator by the user, presenting the causal configuration changes table which is sorted according to the input selection by the user.

These and other features and advantages of the present invention will become apparent to those of ordinary skill in the art in view of the following detailed description of the specific embodiments.

BRIEF DESCRIPTION OF THE DRAWINGS

FIG. 5 shows an example of the result screen of the Cause Analysis Program.

FIG. 6 shows an example of the Event Log Table that resides in the analysis computer.

FIG. 7 shows an example of the Configuration Change History Table that resides in the analysis computer.

FIG. 8 shows an example of the Application Invocation History Table that resides in the analysis computer.

FIG. 9 shows an example of the Causal Configuration Changes Temporary Table that resides in the analysis computer according to a first embodiment of the invention.

FIG. 10 shows an example of the Causal Configuration Changes Table that resides in the analysis computer.

FIG. 11 shows an example of the Fixing Configuration Changes Temporary Table that resides in the analysis computer.

FIG. 12 shows an example of the Fixing Configuration Changes Table that resides in the analysis computer.

FIG. 21 shows an example of the Causal Configuration Changes Table according to a second embodiment of the invention.

FIG. 23 shows an example of the Causal Configuration Changes Table according to a third embodiment of the invention.

DETAILED DESCRIPTION OF THE INVENTION

Figure 1:
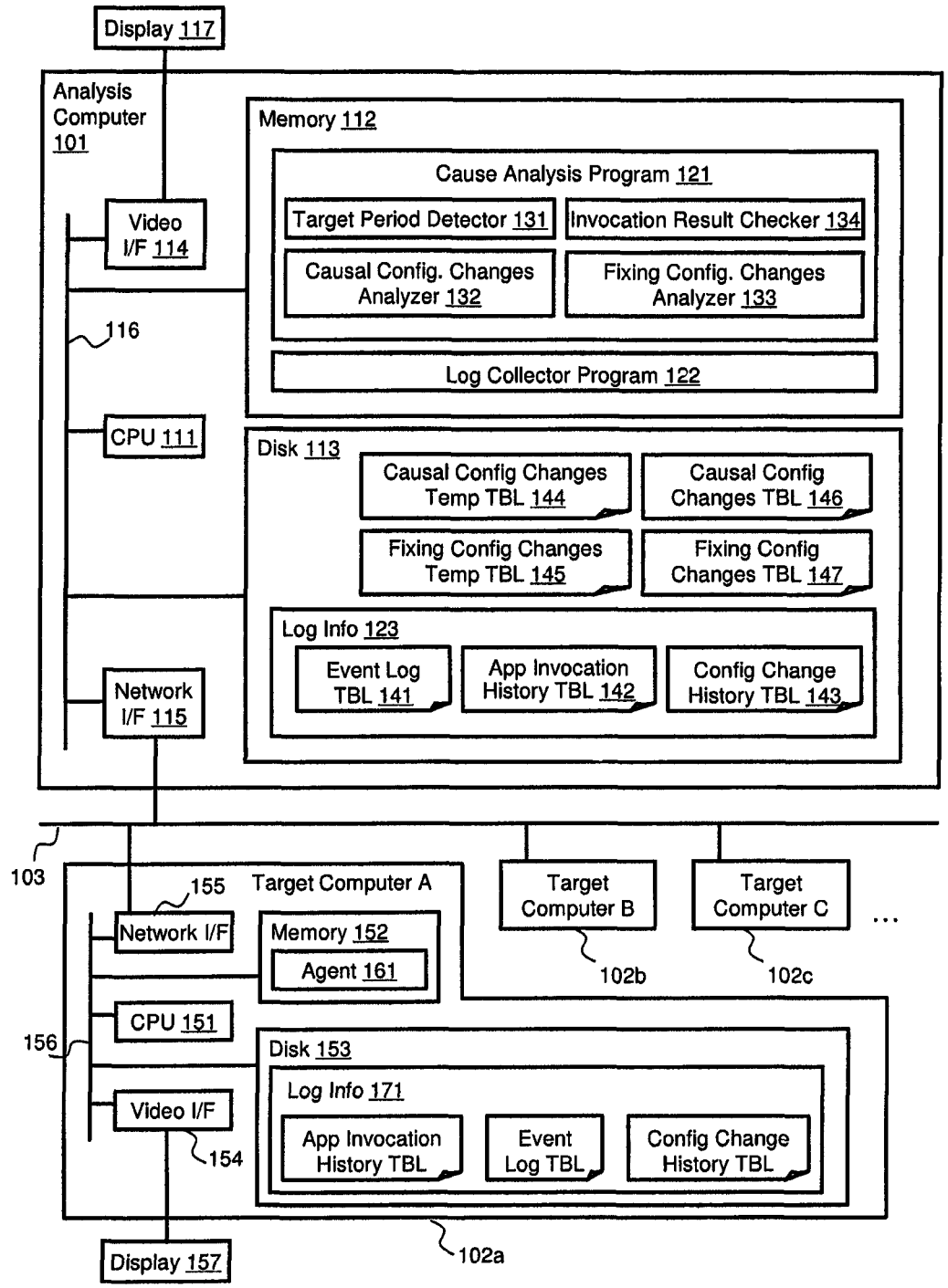
FIG. 1 illustrates an example of a hardware configuration for a client-server architecture in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for finding a solution to an application failure by analyzing configuration changes without using a knowledge database.

A. First Embodiment

1. System Configuration

FIG. 1 illustrates an example of a hardware configuration for a client-server architecture in which the method and apparatus of the invention may be applied. An analysis computer 101 and a plurality of target computers 102 are connected through a LAN 103. The analysis computer 101 is a generic computer that includes a CPU 111, a memory 112, a disk 113, a video interface 114, and a network interface 115. Each element is connected through a system bus 116. The analysis computer 101 has a Cause Analysis Program 121 and a Log Collector Program 122 in its memory 112. The Cause Analysis Program 121 includes a Target Period Detector 131, a Causal Configuration Changes Analyzer 132, a Fixing Configuration Changes Analyzer 133, and an Invocation Result Checker 134, which are executed by the CPU 111. The analysis computer 101 has a Causal Configuration Changes Temporary Table 144, a Fixing Configuration Changes Temporary Table 145, a Causal Configuration Changes Table 146, a Fixing Configuration Changes Table 147, and Log Information 123 in its disk 113. The Log Information 123 includes an Event Log Table 141, an Application Invocation History Table 142, and a Configuration Change History Table 143. The analysis computer 101 has a Network Interface 115 that is connected to the LAN 103 and used to collect Log Information 171 from the plurality of target computers 102. The display 117 is connected to the video interface 114 and used to display the user interface of the Cause Analysis Program 121 and the result of causal configuration change analysis by the Cause Analysis Program 121.

The target computer 102 is a generic computer that includes a CPU 151, a memory 152, a disk 153, a video interface 154, and a network interface 155. Each element is connected through a system bus 156. The target computer 102 has an agent 161 which sends Log Information 171 to the analysis computer 101 via the LAN 103. The target computer 102 has the Log Information 171 in its disk 153. The display 157 is connected to the video interface 154.

Figure 2:
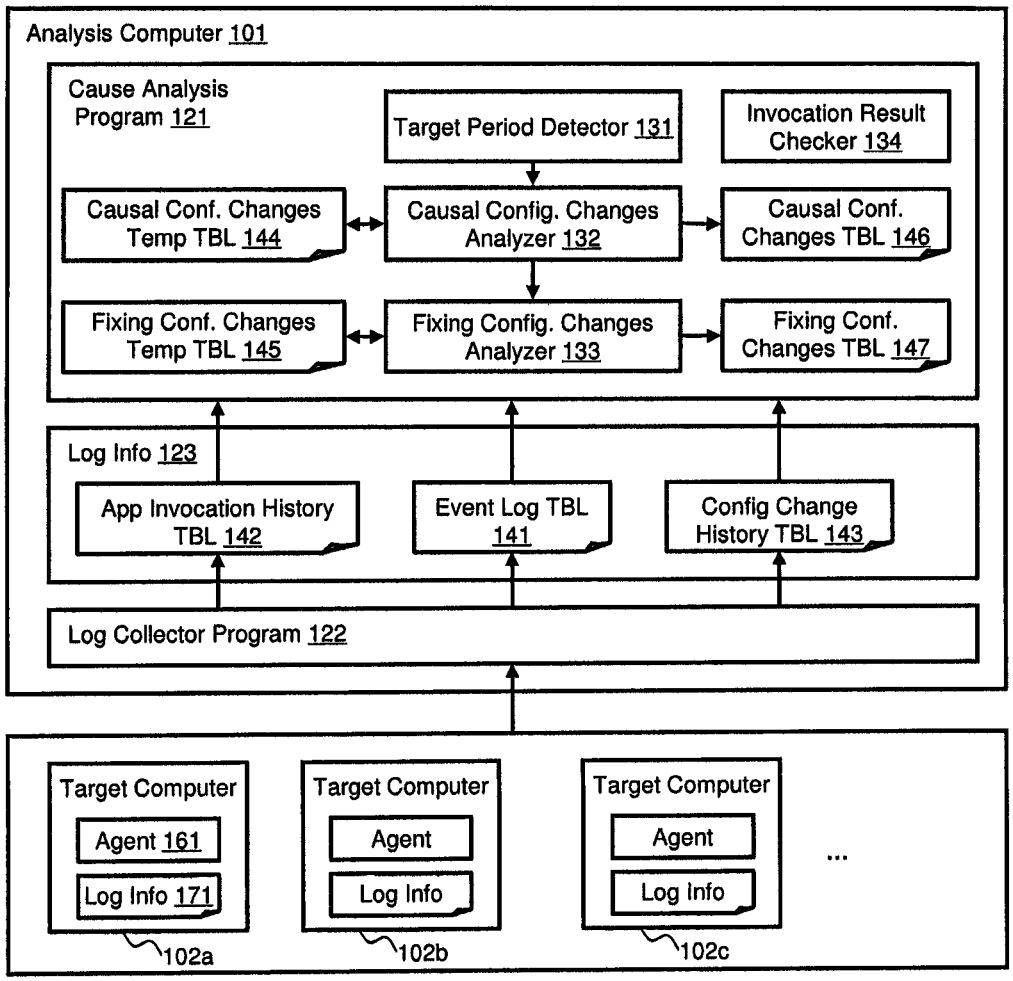
FIG. 2 illustrates an example of a functional block diagram of the invention applied to the architecture of FIG. 1.

FIG. 2 illustrates an example of a functional block diagram of the invention applied to the architecture of FIG. 1. The Log Collector Program 122 resides in the analysis computer 101 and collects the Log Information 171 by communicating with each agent 161 which resides in the target computer 102, and stores the information to the Event Log Table 141, the Application Invocation History Table 142, and the Configuration Change History Table 143 of the Log Information 123 in the analysis computer 101.

The Cause Analysis Program 121 reads the Log Information 123 and executes a causal configuration changes analysis as shown below. The Target Period Detector 131 reads the Event Log Table 141, Application Invocation History Table 142, and Configuration Change History Table 143 to detect the period between the point of time that a certain application could be invoked successfully and the point of time that the application could not be invoked successfully (=failed). Then the Target Period Detector 131 determines the configuration changes on the target computer within the period by referring to the Configuration Change History Table 143. The Causal Configuration Changes Analyzer 132 checks the Log Information 123 of other computers and stores the result to the Causal Configuration Changes Table 146. The Causal Configuration Changes Temporary Table 144 is used as temporary data when the Causal Configuration Changes Analyzer 132 analyzes the causal configuration changes.

The Fixing Configuration Changes Analyzer 133 detects the fixing configuration change and stores the result to the Fixing Configuration Changes Table 147. The Fixing Configuration Changes Temporary Table 145 is used as temporary data when the Fixing Configuration Changes Analyzer 133 analyzes the fixing configuration changes. The fixing configuration change is the configuration change which fixes the problem situation such as application invocation failure. The Invocation Result Checker 134 is the subroutine that detects whether a specific application could be invoked successfully or not, by referring to both the Event Log Table 141 and Application Invocation History Table 142.

Figure 3:
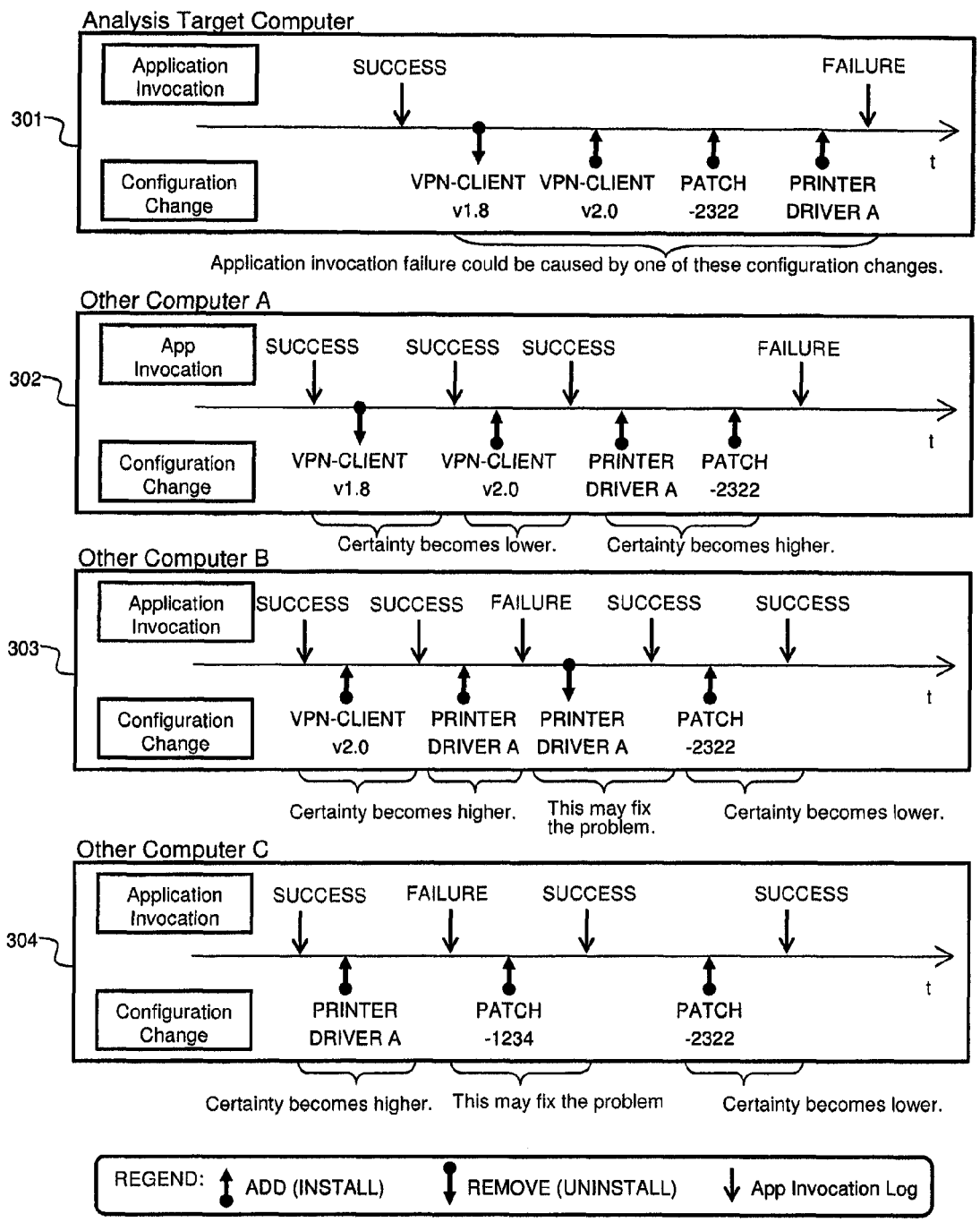
FIG. 3 shows examples of the relationship between application invocation result and configuration change illustrating the basic ideas of the present invention.

FIG. 3 shows examples 301-304 of the relationship between application invocation result and configuration change illustrating the basic ideas of the present invention.

The diagram 301 shows the situation of the target computer 102 of this causal configuration change analysis. According to the diagram 301, four configuration changes happen between successful application invocation and failed invocation. There is no invocation between these configuration changes. Therefore, application invocation failure could be caused by one of these four configuration changes. The diagrams 302, 303 and 304 show the other computers' situations that will be used for detailed analysis.

According to the diagram 302, the same configuration changes happen in another computer A, but neither removing "VPN-CLIENT v1.8" nor adding "VPN-CLIENT v2.0" affects the application invocation. Therefore, the certainty which these two configuration changes affected the application invocation becomes lower. On the other hand, adding "PRINTER DRIVER A" and "PATCH-2322" produces a result between SUCCESS and FAILURE. Therefore, the certainty which these two configuration changes affected the application invocation becomes higher.

According to the diagram 303, adding "PRINTER DRIVER A" produces a result between SUCCESS and FAILURE. Therefore, the certainty which this configuration change affected the application invocation becomes much higher. Moreover, removing "PRINTER DRIVER A" after FAILURE produces a result between FAILURE and SUCCESS. Therefore, removing "PRINTER DRIVER A" might fix the problem. The certainty which this configuration change would fix the application invocation becomes higher. Additionally, because adding "PATCH-2322" produces a result between SUCCESS and SUCCESS, the certainty which this configuration change affected the application invocation becomes lower.

According to the diagram 304, adding "PATCH-1234" is between FAILURE and SUCCESS, so adding "PATCH-1234" might fix the problem. This kind of observation can lead to two kinds of results. One is the certainty as to which configuration changes affected the application invocation. The other is the certainty as to which configuration changes can fix the problem (failure) of the application invocation. The number of other computers is three in this example, but the accuracy of analysis can be higher by increasing the number of other computers.

2. User Interfaces of Analysis Program

Figure 4:
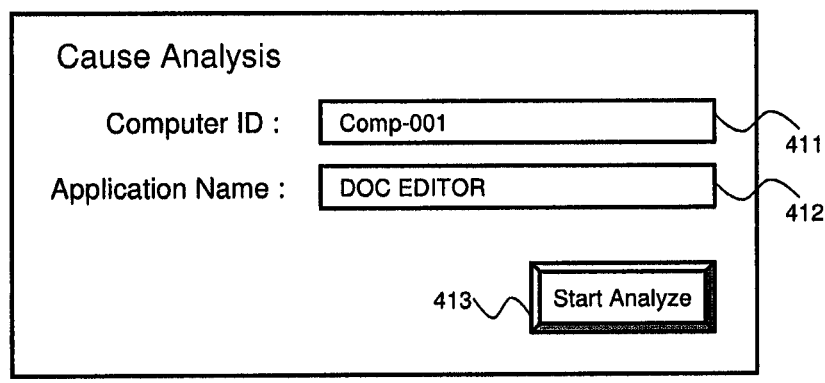
FIG. 4 shows an example of the user interface of the Cause Analysis Program.

FIG. 4 shows an example of the user interface 401 of the Cause Analysis Program 121. The user can initiate the analysis by using this user interface 401. The Cause analysis Program User Interface 401 has two text boxes to input the analysis condition. One is the Computer ID 411, which the user can use to specify the identifier of the analysis target computer. The other is the Application Name 412, which the user can use to specify the application name that has a problem. To start the analysis, the user can press the "Start Analyze" button 413.

FIG. 5 shows an example of the result screen of the Cause Analysis Program 121. Possible causal configuration changes are displayed in the form of ranking in the upper pane. The column 511 shows the configuration item. The column 512 shows the change type. The column 513 shows the date and time corresponding to configuration change (i.e., 511 and 512). FIG. 5 shows four configuration change records 521-524. The column 514 shows the graphical bar chart that indicates the certainty corresponding to the configuration change. The area 525 indicates the number of the configuration change cases ("PRINTER DRIVER A"—"ADD") in record 521 which affected the invocation of the specified application in all computers. The area 526 indicates the number of the configuration change cases ("PRINTER DRIVER A"—"ADD") which did not affect the invocation of the specified application in all computers. The percentages above the bar chart show the ratios of 525 and 526. The symbol 515 is the sorting key indicator. In this example, these configuration changes are shown in the order of the rate (certainty), not counts. This indicator can be moved to other columns by clicking the link (underline) of each column.

Possible fixing configuration changes are displayed in the form of ranking in the lower pane. The column 531 shows the configuration item. The column 532 shows the change type. The column 533 shows the graphical bar chart that indicates the certainty corresponding to the configuration change. FIG. 5 shows three configuration change records 541-543. The area 544 indicates the number of the configuration change cases ("PRINTER DRIVER A"—"REMOVE") in record 541 which fixed the invocation failure of the specified application in all computers. The area 545 indicates the number of the configuration change cases ("PRINTER DRIVER A"—"REMOVE") which did not fix the invocation failure of the specified application in all computers. The percentages above the bar chart show the ratios of 544 and 545. The symbol 534 is the sorting key indicator. In this example, these configuration changes are shown in the order of the rate (certainty), not counts.

3. Data Structures

FIG. 6 shows an example of the Event Log Table 141 that resides in the analysis computer 101. The event log data in this table is used to determine whether the specified application could be invoked successfully or not. The Invocation Result Checker 134 checks the number of events right after the application invocation time. If some events are found within a certain period right after the invocation, the Invocation Result Checker 134 judges that the invocation of the application failed.

The Event Log Table 141 contains three columns, Computer ID (601), Date Time (602) and Event Type (603). The Computer ID 601, Date Time 602, and Event Type 603 are collected from the agent 161 of each target computer 102 and stored to this table by the Log Collector Program 122. The table schema of the Event Log Table in each target computer 102 is the same as that of the Event Log Table 141 in the analysis computer 101 in this embodiment. FIG. 6 shows event log records 415-417 for Comp-001 records 421-422 for Comp-002, record 431 for Comp-003, record 441 for Comp-006, and records 451-452 for Comp-007, and so on. The Event Log Table in each target computer 102 has its own event log data. The Event Log Table 141 in the analysis computer 101 has all event log data collected from each target computer 102.

FIG. 7 shows an example of the Configuration Change History Table 143 that resides in the analysis computer 101. The configuration change history data in this table is used to determine what kind of configuration changes were made between successful application invocation and failed invocation, and what kind of configuration changes fixed the failed application invocation.

The Configuration Change History Table 143 contains four columns: Computer ID 701, Change Date Time 702, Configuration Item 703, and Change Type 704. The four columns of data are collected from the agent 161 of each target computer 102 and stored to this table by the Log Collector Program 122. The table schema of the Configuration Change History Table in each target computer 102 is the same as that of the Configuration Change History Table 143 in the analysis computer 101 in this embodiment. The Configuration Change History Table in each target computer 102 has its own configuration change history data. The Configuration Change History Table 143 in the analysis computer 101 has all configuration change history data collected from each target computer 102.

Examples of configuration items include the following: software, application (add/remove), patch (add/remove), driver (add/remove), OS setting, processor scheduling (programs/background services), memory usage (programs/system cache), any registry items, hardware, memory capacity, hard drive capacity, BIOS setting, hyper thread (on/off), and virtualization technology (on/off). FIG. 7 shows configuration change history records 711-716 for Comp-001, records 721-726 for Comp-002, records 731-734 for Comp-003, records 741-743 for Comp-004, records 751-752 for Comp-005, records 761-762 for Comp-006, and so on.

FIG. 8 shows an example of the Application Invocation History Table 142 that resides in the analysis computer 101. The application invocation history data in this table is used to determine when the application is invoked before and after the configuration changes. This table contains three columns: Computer ID 801, Invocation Date Time 802, and Application Name 803. The three columns of data are collected from the agent 161 of each target computer 102 and stored to this table by the Log Collector Program 122. The table schema of the Application Invocation History Table in each target computer 102 is the same as that of the Application Invocation History Table 142 in the analysis computer 101 in this embodiment. The Application Invocation History Table in each target computer 102 has its own application invocation history data. The Application Invocation History Table 142 in the analysis computer 101 has all application invocation history data collected from each target computer 102. FIG. 8 shows application invocation history records 811-820 for Comp-001, records 821-822 for Comp-002, records 831-835 for Comp-003, records 841-844 for Comp-004, record 851 for Comp-005, and so on.

FIG. 9 shows an example of the Causal Configuration Change Temporary Table 144 that resides in the analysis computer 101 according to a first embodiment of the invention. This table is a temporary table when the Cause Analysis Program 121 determines the causal configuration changes. This table shows the results of application invocation before and after the configuration changes. This table contains six columns: Computer ID 901, Change Date Time 902, Configuration Item 903, Change Type 904, Invocation-Before 905, and Invocation-After 906. The Invocation-Before 905 shows the results of application invocation before the configuration changes. The Invocation-After 906 shows the results of application invocation after the configuration changes.

For the analysis target computer 102, the records indicate the period from the last successful application invocation to the first failed application invocation. Assume that the value of Computer ID 901 of analysis target computer 102 in FIG. 9 is "Comp-001." For example, all values of the pair of Invocation-Before 905 and Invocation-After 906 of the records (911-914) are SUCCESS and FAILURE, respectively. For the other computers, the records indicate the invocation result of the application before and after the configuration changes which are the same as those of the analysis target computers 102. For example, the value of the pair of Configuration Item 903 and Change Type 904 must be one of "PRINTER DRIVER A—ADD," "PATCH-2322—ADD," "VPN-CLIENT v2.0—ADD," or "VPN-CLIENT v1.8—REMOVE." FIG. 9 shows causal configuration change records 911-914 for Comp-001, records 921-924 for Comp-002, records 931-932 for Comp-003, records 941-942 for Comp-004, records 951-952 for Comp-005, record 961 for Comp-006, record 971 for Comp-007, and so on.

FIG. 10 shows an example of the Causal Configuration Changes Table 146 that resides in the analysis computer 101. This table is a result table created by the Cause Analysis Program 121. This table shows which configuration change made the application invocation fail and the corresponding certainty. This table contains five columns: Configuration Item 1001, Change Type 1002, Change Date Time 1003, Number of Failure Cases 1004, and Number of All Cases 1005. The Number of All Cases 1005 indicates the number of all cases for the pair of Configuration Item 1001 and Change Type 1002. The Number of Failure Cases 1004 indicates the number of failed cases for the pair of Configuration Item 1001 and Change Type 1002. FIG. 10 shows four causal configuration change records 1011-1014. For example, in the record 1011, the configuration change is "PRINTER DRIVER A—ADD," the Number of Failure Cases 1004 is 12 and the Number of All Cases 1005 is 15.

FIG. 11 shows an example of the Fixing Configuration Changes Temporary Table 145 that resides in the analysis computer 101. This table is a temporary table when the Cause Analysis Program 121 determines the fixing configuration changes. This table shows the results of application invocation before and after the configuration changes which were made between the invocation failure and the invocation success of the specified application. This table contains six columns: Computer ID 1101, Change Date Time 1102, Configuration Item 1103, Change Type 1104, Invocation-Before 1105, and Invocation-After 1106. The meaning of each column is the same as that of the Causal Configuration Changes Temporary Table 144. FIG. 11 shows fixing configuration change records 1111-1113 for Comp-001, record 1121 for Comp-002, record 1131 for Comp-003, record 1141 for Comp-004, and so on.

FIG. 12 shows an example of the Fixing Configuration Changes Table 147 that resides in the analysis computer 101. This table is a result table created by the Cause Analysis Program 121. This table shows which configuration change fixed the failed application invocation and the corresponding certainty. This table contains four columns: Configuration Item 1201, Change Type 1202, Number of Fixing Cases 1203, and Number of All Cases 1204. The Number of All Cases 1204 indicates the number of all cases for the pair of Configuration Item 1201 and Change Type 1202. The Number of Fixing Cases 1203 indicates the number of fixing cases for the pair of Configuration Item 1201 and Change Type 1202. For example, in the record 1211, the configuration change is "PRINTER DRIVER A—ADD," the Number of Fixing Cases 1203 is 29, and the Number of All Cases 1204 is 33. FIG. 12 shows fixing configuration change records 1211-1213.

4. Process Flow

Figure 13:
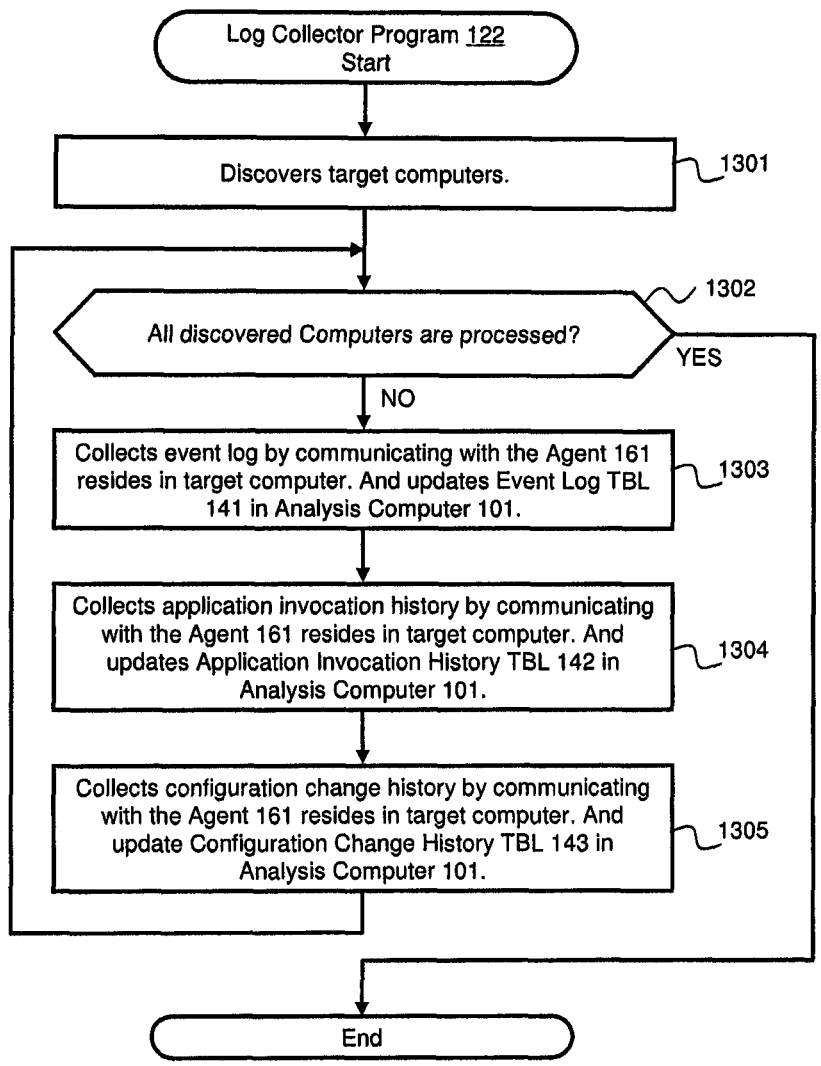
FIG. 13 is an example of a flow diagram illustrating log collecting as executed by the Log Collector Program residing in the analysis computer.

FIG. 13 is an example of a flow diagram illustrating log collecting as executed by the Log Collector Program 122 residing in the analysis computer 101. The Log Collector Program 122 initiates its process periodically in a certain interval. As illustrated in FIG. 13, in step 1301, the Log Collector Program 122 discovers the target computers for log collecting. In step 1302, the Log Collector Program (122) checks whether all discovered computers are processed or not. If yes, the process ends. If no, the process proceeds to step 1303. In step 1303, the Log Collector Program 122 collects the event log by communicating with the agent 161 residing in the target computer 102. It also updates the Event Log Table 141 in the analysis computer 101. In step 1304, the Log Collector Program 122 collects the application invocation history by communicating with the agent 161 residing in target computer 102. It also updates the Application Invocation History Table 142 in the analysis computer 101. In step 1305, the Log Collector Program 122 collects the configuration change history by communicating with the agent 161 residing in the target computer 102. It also updates the Configuration Change History Table 143 in the analysis computer 101. If the log information from all the discovered computers is processed, the Log Collector Program 122 ends the process (checked at step 1302).

Figure 14:
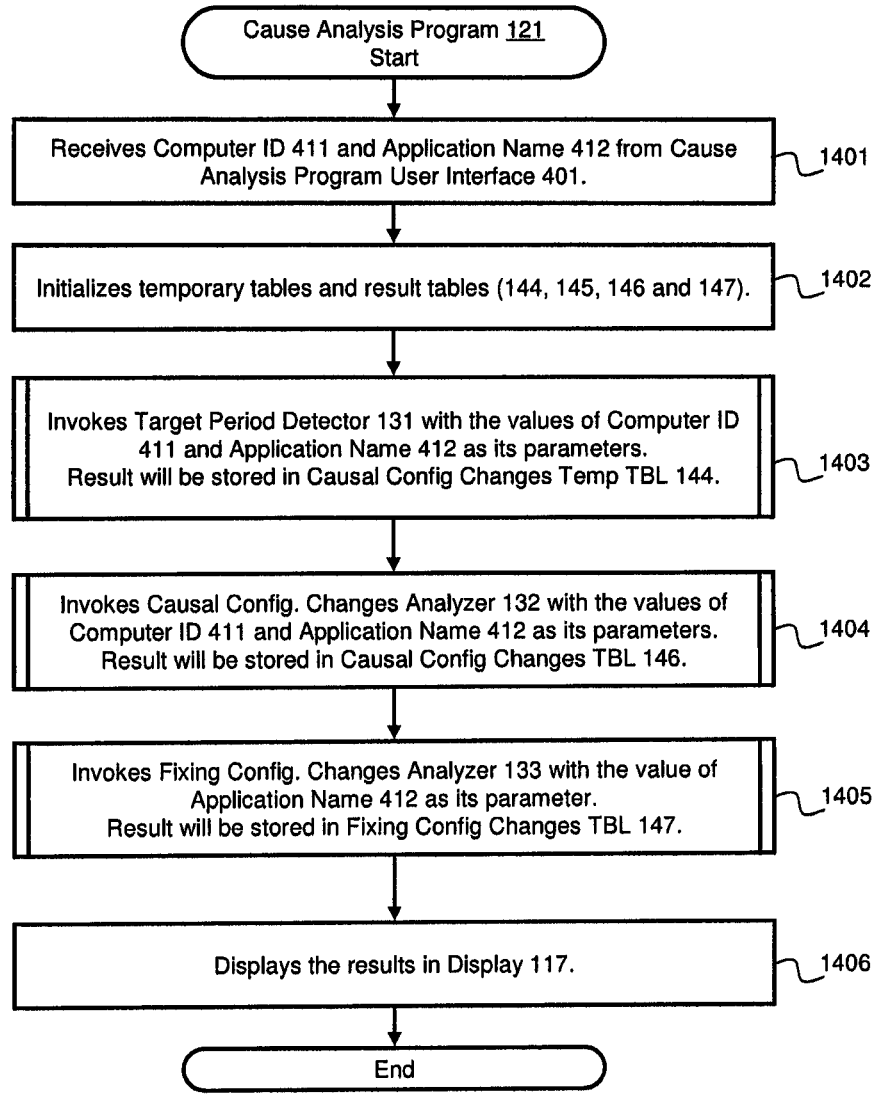
FIG. 14 is an example of a flow diagram illustrating causal analysis as executed by the Cause Analysis Program residing in the analysis computer according to the first embodiment of the invention.

FIG. 14 is an example of a flow diagram illustrating causal analysis as executed by the Cause Analysis Program 121 residing in the analysis computer 101 according to the first embodiment of the invention. The Cause Analysis Program 121 initiates the process by the user operation on the Cause Analysis Program User Interface 401. As illustrated in FIG. 14, in step 1401, the Cause Analysis Program 121 receives the Computer ID 411 and Application Name 412 from the Cause Analysis Program User Interface 401 as the parameters. In this explanation, the Computer ID is "Comp-001" and the Application Name is "DOC EDITOR." In step 1402, the Cause Analysis Program 121 initializes temporary tables and result tables (144, 145, 146 and 147).

In step 1403, the Cause Analysis Program 121 invokes the Target Period Detector 131 with the values of the Computer ID 411 and Application Name 412 as its parameters. The result will be stored in Causal Configuration Changes Temporary Table 144. As of this step, the records (911-914) are stored in the Configuration Changes Temporary Table 144. Thus, the configuration change that caused the application invocation failure might be one of these configuration changes (911-914).

In step 1404, the Cause Analysis Program 121 invokes the Causal Configuration Changes Analyzer 132 with the values of the Computer ID 411 and Application Name 412 as its parameters. The result will be stored in the Causal Configuration Changes Table 146. As of this step, the records (1011-1014) are stored in the Causal Configuration Changes Table 146.

In step 1405, the Cause Analysis Program 121 invokes the Fixing Configuration Changes Analyzer 133 with the value of the Application Name 412 as its parameter. The result will be stored in the Fixing Configuration Changes Table 147. As of this step, the records (1211-1213) are stored in the Fixing Configuration Changes Table 147. In step 1406, the Cause Analysis Program 121 displays the results on the display 117.

Figure 15:
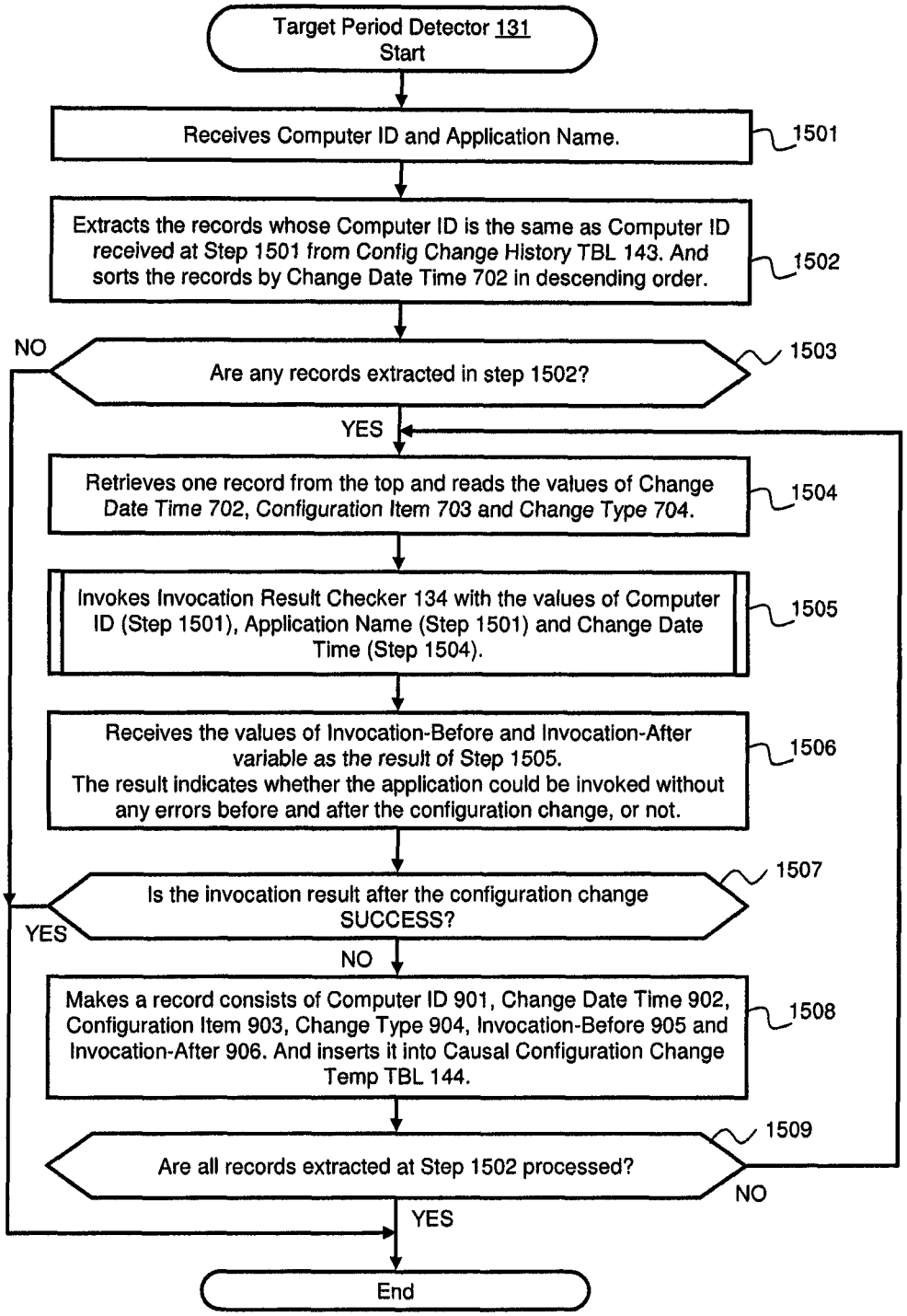
FIG. 15 is an example of a flow diagram illustrating the target period detection process as executed by the Target Period Detector residing in the analysis computer.

FIG. 15 is an example of a flow diagram illustrating the target period detection process as executed by the Target Period Detector 131 residing in the analysis computer 101. The Target Period Detector 131 initiates the process by invocation from the Cause Analysis Program 121. As illustrated in FIG. 15, in step 1501, the Target Period Detector 131 receives the Computer ID and Application Name as the parameter. In this explanation, the Computer ID is "Comp-001" and the Application Name is "DOC EDITOR."

In step 1502, the Target Period Detector 131 extracts the records whose Computer ID is the same as the Computer ID received at Step 1501 from the Configuration Change History Table 143. It sorts the records by the Change Date Time 702 in descending order. As of this step, the records whose Computer ID 701 is "Comp-001" are extracted (711-716 on the Configuration Change History Table 143).

In step 1503, the Target Period Detector 131 checks whether any records are extracted in step 1502 or not. If yes, the process proceeds to step 1504. If no, the process ends.

In step 1504, the Target Period Detector 131 retrieves one record from the top and reads the values of the Change Date Time 702, Configuration Item 703, and Change Type 704. In the first execution of this loop, the value of the Change Date Time 702 is "06/04/2008 08:20:11," the Configuration Item 703 is "PRINTER DRIVER A," and the Change Type (704) is "ADD."

In step 1505, the Target Period Detector 131 invokes the Invocation Result Checker 134 with the values of the Computer ID (Step 1501), Application Name Step (1501), and Change Date Time (Step 1504) as the parameters. In the first execution of this loop, the parameters are "Comp-001," "DOC EDITOR," and "06/04/2008 08:20:11."

In step 1506, the Target Period Detector 131 receives the values of the Invocation-Before and Invocation-After variables as the result of step 1505. The result indicates whether the application could be invoked without any errors before and after the configuration change, or not. In the first execution of this loop, the result value of Invocation-Before is "SUCCESS" and the result value of Invocation-After is "FAILURE."

In step 1507, the Target Period Detector 131 checks the invocation result after the configuration change is SUCCESS, or not. If yes, the process ends. If no, the process proceeds to step 1508.

In step 1508, the Target Period Detector 131 makes a record of the Computer ID 901, Change Date Time 902, Configuration Item 903, Change Type 904, Invocation-Before 905, and Invocation-After 906. It inserts the record into the Causal Configuration Changes Temp Table 144. As of this step of the first loop, the record 911 is stored in the Causal Configuration Change Temporary Table 144.

In step 1509, the Target Period Detector 131 checks whether all records extracted at step 1502 are processed or not. If yes, the process ends. If no, the process returns to step 1504. In this embodiment, after the execution of the Target Period Detector 131, the records (911-914) are stored in the Configuration Changes Temporary Table 144.

Figure 16:
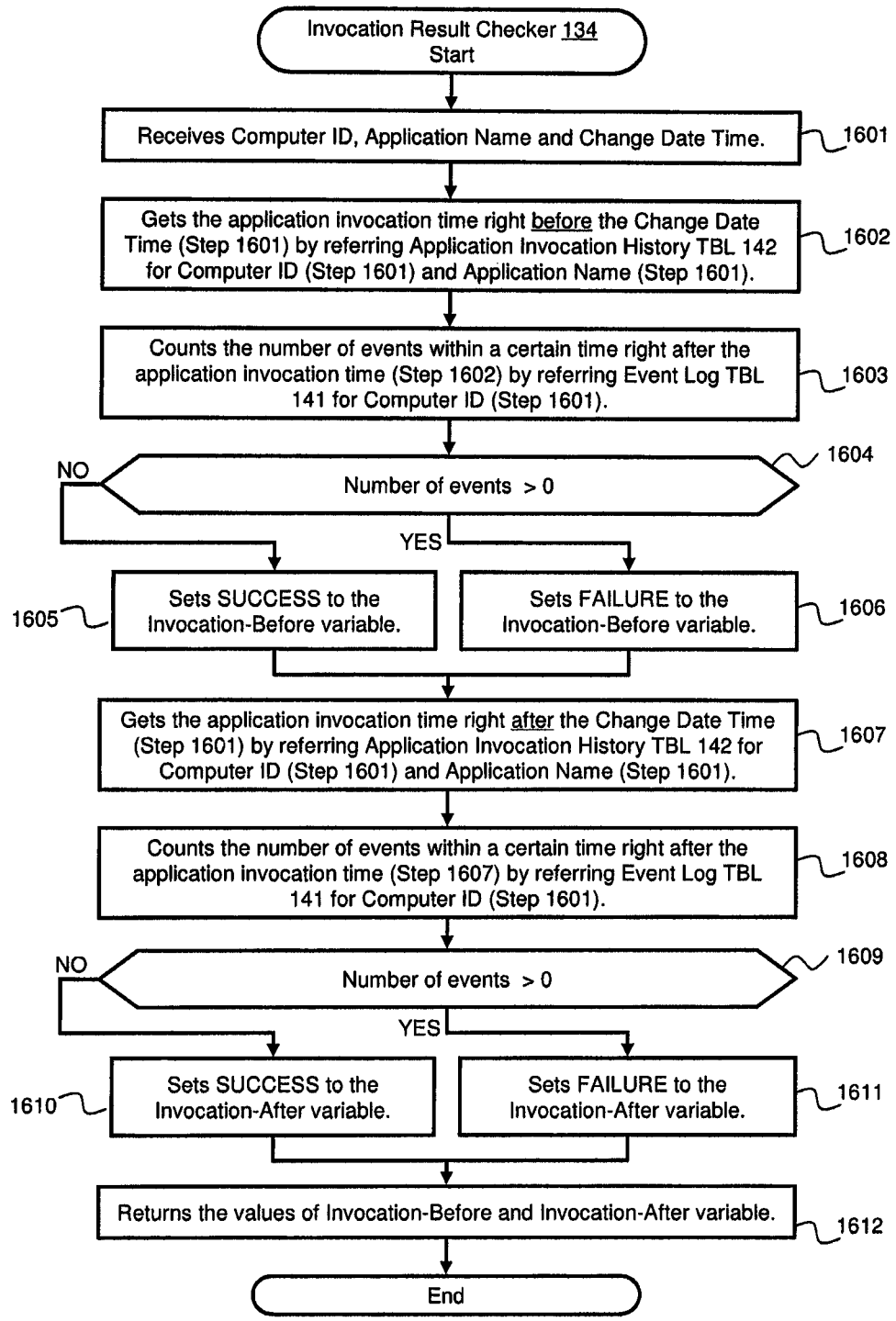
FIG. 16 is an example of a flow diagram illustrating the application invocation result checking process as executed by the Invocation Result Checker residing in the analysis computer.

FIG. 16 is an example of a flow diagram illustrating the application invocation result checking process as executed by the Invocation Result Checker 134 residing in the analysis computer 101. The Invocation Result Checker 134 initiates the process by invocation from the Target Period Detector 131, Causal Configuration Changes Analyzer 132, and Fixing Configuration Changes Analyzer 133. As illustrated in FIG. 16, in step 1601, the Invocation Result Checker 134 receives the Computer ID, Application Name, and Change Date Time as the parameters. For example, the Computer ID is "Comp-001," the Application Name is "DOC EDITOR," and the Change Date Time is "06/04/2008 08:20:11."

In step 1602, the Invocation Result Checker 134 gets the application invocation time right before the Change Date Time (step 1601) by referring to the Application Invocation History Table 142 for the Computer ID (step 1601) and Application Name (step 1601). When the received Change Date Time is "06/04/2008 08:20:11," the application invocation time of "DOC EDITOR" right before the "06/04/2008 08:20:11" can be found as "06/02/2008 14:26:03" (818) in the Application Invocation History Table 142.

In step 1603, the Invocation Result Checker 134 counts the number of events within a certain time right after the application invocation time (step 1602) by referring to the Event Log Table 141 for the Computer ID (step 1601). When the invocation time is "06/02/2008 14:26:03," the number of events within 10 seconds is 0.

In step 1604, the Invocation Result Checker 134 checks the number of events counted in step 1603. If it is greater than 0, the process proceeds to step 1606. Otherwise, the process proceeds to step 1605. In step 1605, the Invocation Result Checker 134 sets SUCCESS to the Invocation-Before variable. Because the number of events is 0, the Invocation-Before variable is set to SUCCESS. In step 1606, the Invocation Result Checker 134 sets FAILURE to the Invocation-Before variable.

In step 1607, the Invocation Result Checker 134 gets the application invocation time right after the Change Date Time (step 1601) by referring to the Application Invocation History Table 142 for the Computer ID (step 1601) and Application Name (step 1601). When the received Change Date Time is "06/04/2008 08:20:11," the application invocation time of "DOC EDITOR" right after the "06/04/2008 08:20:11" can be found as "06/04/2008 08:29:23" (record 417) in the Application Invocation History Table 142.

In step 1608, the Invocation Result Checker 134 counts the number of events within a certain time right after the application invocation time (step 1607) by referring to the Event Log Table 141 for the Computer ID (step 1601). When the invocation time is "06/04/2008 08:29:23," the number of events within 10 seconds is 1.

In step 1609, the Invocation Result Checker 134 checks the number of events counted in step 1608. If it is greater than 0, the process proceeds to step 1611. Otherwise, the process proceeds to step 1610. In step 1610, the Invocation Result Checker 134 sets SUCCESS to the Invocation-After variable. In step 1611, the Invocation Result Checker 134 sets FAILURE to the Invocation-After variable. Because the number of events is 1, the Invocation-After variable is set to FAILURE.

In step 1612, the Invocation Result Checker 134 returns the values of the Invocation-Before and Invocation-After variables. In this explanation, the return value of Invocation-Before is SUCCESS and the value of Invocation-After is FAILURE.

Figure 17:
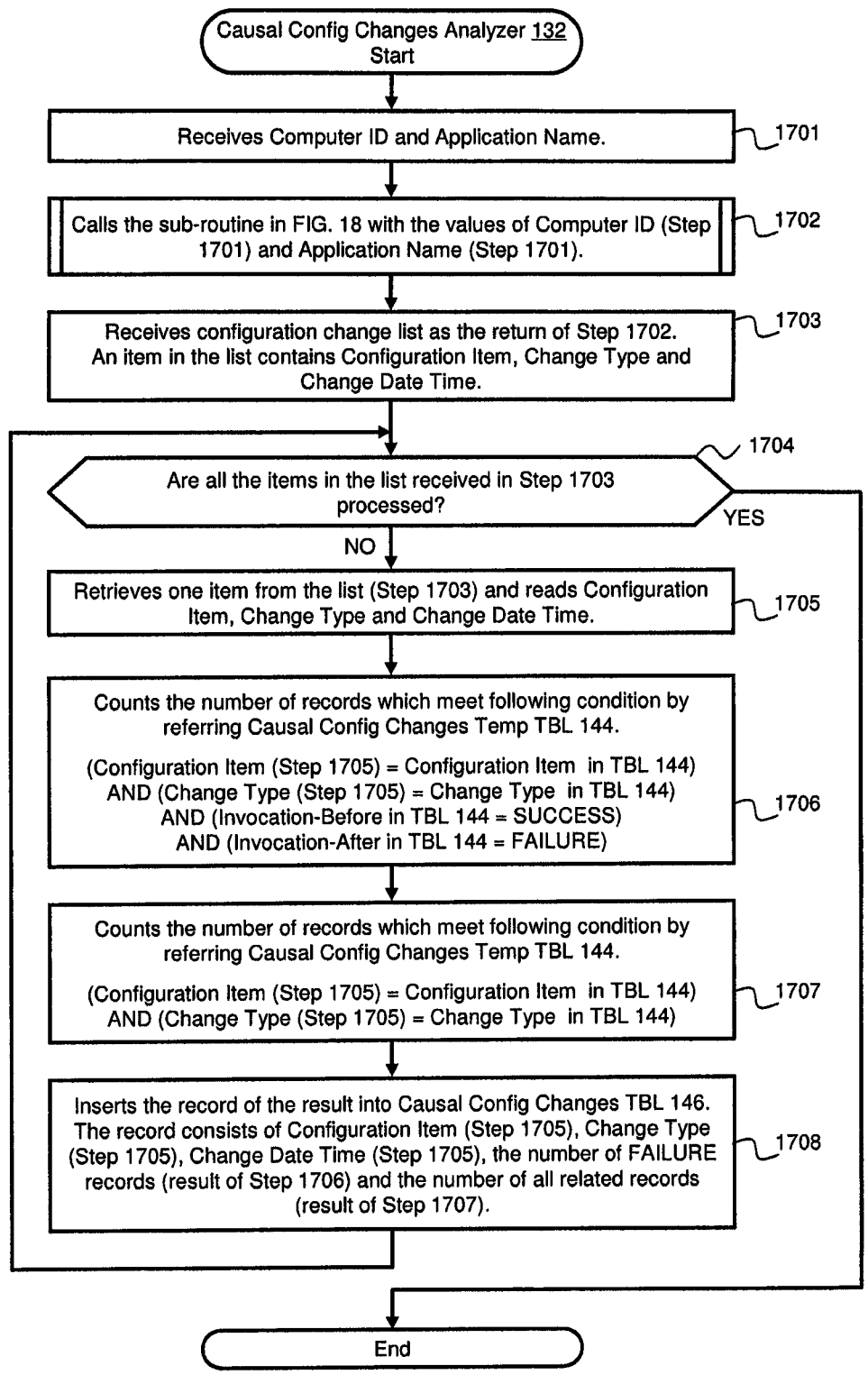
FIG. 17 is an example of a flow diagram illustrating the causal configuration change analysis process as executed by the Causal Configuration Changes Analyzer residing in the analysis computer according to the first embodiment of the invention.

FIG. 17 is an example of a flow diagram illustrating the causal configuration change analysis process as executed by the Causal Configuration Changes Analyzer 132 residing in the analysis computer 101 according to the first embodiment of the invention. The Causal Configuration Changes Analyzer 132 initiates the process by invocation from the Cause Analysis Program 121. As illustrated in FIG. 17, in step 1701, the Causal Configuration Changes Analyzer 132 receives the Computer ID and Application Name as the parameters. In this explanation, the Computer ID is "Comp-001" and the Application Name is "DOC EDITOR." In step 1702, the Causal Configuration Changes Analyzer 132 calls the subroutine in FIG. 18 with the values of the Computer ID (step 1701) and the Application Name (step 1701). As of this step, the records (911-971) are stored in the Causal Configuration Change Temporary Table 144. In step 1703, the Causal Configuration Changes Analyzer 132 receives the configuration change list as the return of step 1702. An item in the list contains the Configuration Item, Change Type, and Change Date Time. In this explanation, the configuration change list contains "PRINTER DRIVER A—ADD—06/04/2008 08:20:11," "PATCH-2322—ADD—06/04/2008 07:43:11," "VPN-CLIENT v2.0—ADD—06/03/2008 14:27:35," and "VPN-CLIENT v1.8—REMOVE—06/03/2008 13:59:28."

In step 1704, the Causal Configuration Changes Analyzer 132 checks whether all the items in the list received in step 1703 are processed or not. If yes, the process ends. If no, the process proceeds to step 1705. In step 1705, the Causal Configuration Changes Analyzer 132 retrieves one item from the list (step 1703) and reads the Configuration Item, Change Type, and Change Date Time. In step 1706, the Causal Configuration Changes Analyzer 132 counts the number of records which meet the following condition by referring to the Causal Configuration Changes Temp Table 144: (Configuration Item (Step 1705)=Configuration Item in Table 144), AND (Change Type (Step 1705)=Change Type in Table 144), AND (Invocation-Before in Table 144=SUCCESS), AND (Invocation-After in Table 144=FAILURE). In step 1707, the Causal Configuration Changes Analyzer 132 counts the number of records which meet the following condition by referring to the Causal Configuration Changes Temp Table 144: (Configuration Item (step 1705)=Configuration Item in Table 144), AND (Change Type (step 1705)=Change Type in Table 144). In step 1708, the Causal Configuration Changes Analyzer 132 inserts the record of the result into the Causal Configuration Changes Table 146. The record includes the Configuration Item (step 1705), Change Type (step 1705), Change Date Time (step 1705), the number of FAILURE records (result of step 1706), and the number of all related records (result of step 1707). As of this step, the records (1011-1014) are stored in the Causal Configuration Changes Table 146.

Figure 18:
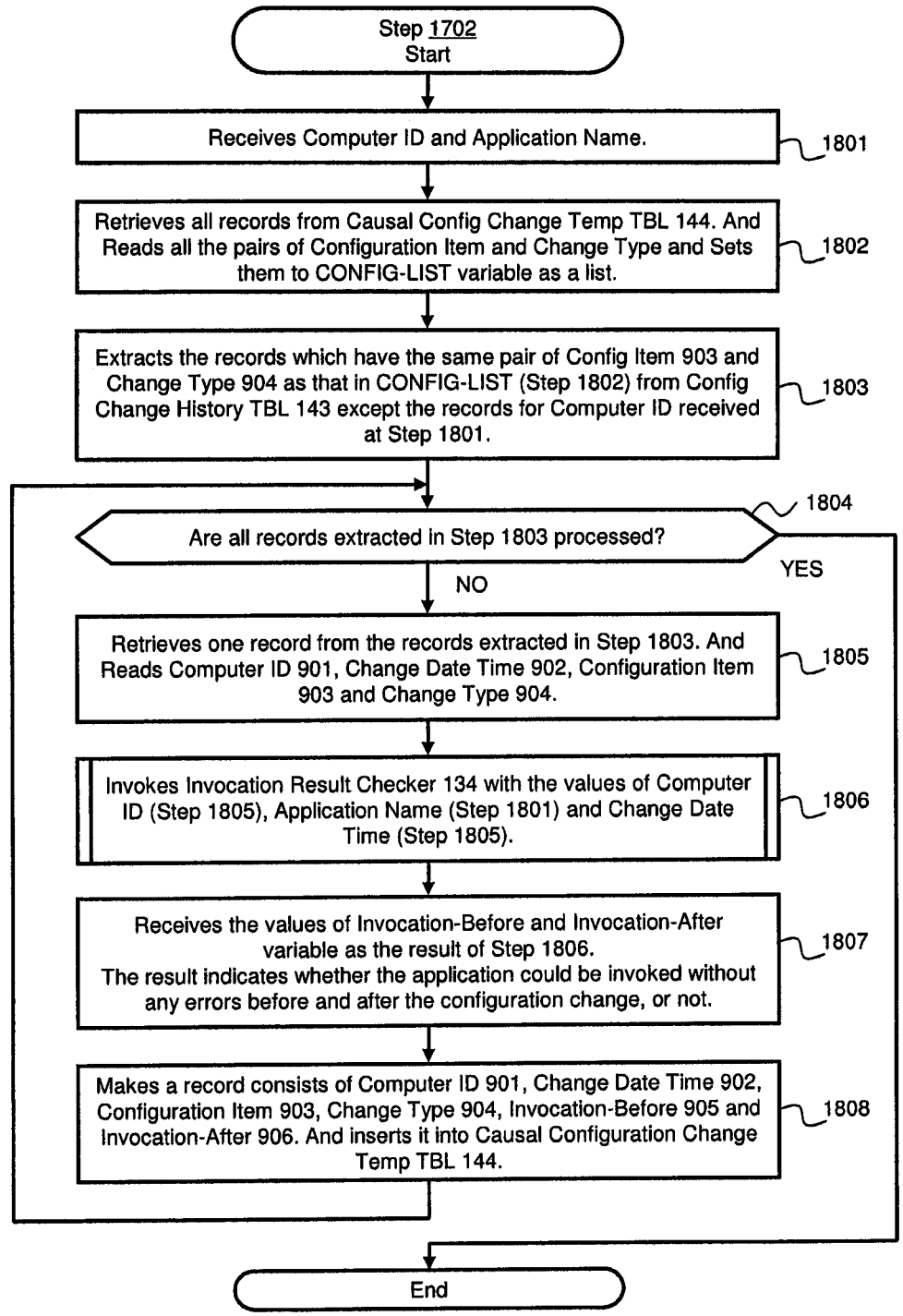
FIG. 18 is an example of a flow diagram illustrating the subroutine of the causal configuration change analysis process of FIG. 17.

FIG. 18 is an example of a flow diagram illustrating the subroutine of the causal configuration change analysis process in step 1702 of FIG. 17. This subroutine initiates the process by invocation from the Causal Configuration Changes Analyzer 132. As illustrated in FIG. 18, in step 1801, this subroutine receives the Computer ID and Application Name as the parameters. In this explanation, the Computer ID is "Comp-001" and the Application Name is "DOC EDITOR." In step 1802, this subroutine retrieves all records from the Causal Configuration Changes Temp Table 144. It reads all the pairs of Configuration Item and Change Type and sets them to the CONFIG-LIST variable as a list. As of this step, the CONFIG-LIST variable contains "PRINTER DRIVER A—ADD," "PATCH-2322—ADD," "VPN-CLIENT v2.0—ADD," and "VPN-CLIENT v1.8—REMOVE." In step 1803, this subroutine extracts the records which have the same pair of Configuration Item 903 and Change Type 904 as that in the CONFIG-LIST (step 1802) from the Configuration Change History Table 143 except the records for the Computer ID received at step 1801.

In step 1804, this subroutine checks whether all records extracted in step 1803 are processed or not. If yes, the process ends. If no, the process proceeds to step 1805. In step 1805, this subroutine retrieves one record from the records extracted in step 1803, and reads the Computer ID 901, Change Date Time 902, Configuration Item 903, and Change Type 904. In step 1806, this subroutine invokes the Invocation Result Checker 134 with the values of the Computer ID (step 1805), Application Name (step 1801), and Change Date Time (step 1805). In step 1807, this subroutine receives the values of the Invocation-Before and Invocation-After variable as the result of step 1806. The result indicates whether the application could be invoked without any errors before and after the configuration change, or not. In step 1808, this subroutine makes a record including the Computer ID 901, Change Date Time 902, Configuration Item 903, Change Type 904, Invocation-Before 905, and Invocation-After 906. It inserts the record into the Causal Configuration Changes Temp Table 144.

Figure 19:
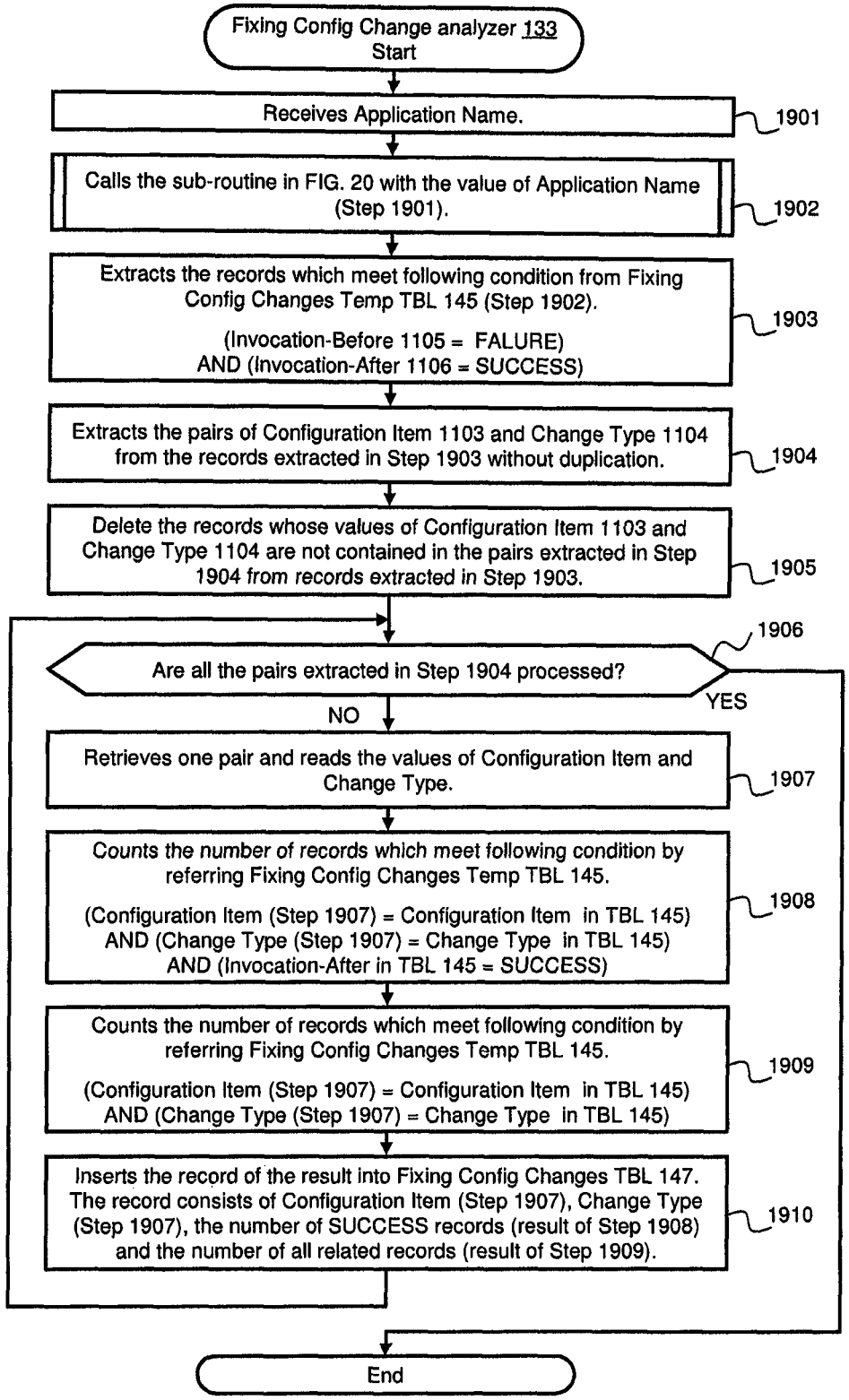
FIG. 19 is an example of a flow diagram illustrating the fixing configuration change analysis process as executed by the Fixing Configuration Changes Analyzer residing in the analysis computer.

FIG. 19 is an example of a flow diagram illustrating the fixing configuration change analysis process as executed by the Fixing Configuration Changes Analyzer 133 residing in the analysis computer 101. The Fixing Configuration Changes Analyzer 133 initiates the process by invocation from the Cause Analysis Program 121. As illustrated in FIG. 19, in step 1901, the Fixing Configuration Changes Analyzer 133 receives the Application Name as the parameter. In this explanation, the Application Name is "DOC EDITOR." In step 1902, the Fixing Configuration Changes Analyzer 133 calls the subroutine in FIG. 20 with the value of the Application Name (step 1901). In step 1903, the Fixing Configuration Changes Analyzer 133 extracts the records which meet the following condition from the Fixing Configuration Changes Temp Table 145 (step 1902): (Invocation-Before 1105=FAILURE) AND (Invocation-After 1106=SUCCESS). In step 1904, the Fixing Configuration Changes Analyzer 133 extracts the pairs of Configuration Item 1103 and Change Type 1104 from the records extracted in step 1903 without duplication. In step 1905, the Fixing Configuration Changes Analyzer 133 deletes the records whose values of the Configuration Item 1103 and Change Type 1104 are not contained in the pairs extracted in step 1904 from records extracted in step 1903.

In step 1906, the Fixing Configuration Changes Analyzer 133 checks whether all the pairs extracted in step 1904 are processed or not. If yes, the process ends. If no, the process proceeds to step 1907. In step 1907, the Fixing Configuration Changes Analyzer 133 retrieves one pair and reads the values of the Configuration Item 1103 and Change Type 1104. In step 1908, the Fixing Configuration Changes Analyzer 133 counts the number of records which meet the following condition by referring to the Fixing Configuration Changes Temp Table 145: (Configuration Item (step 1907)=Configuration Item in Table 145), AND (Change Type (step 1907)=Change Type in Table 145), AND (Invocation-After in Table 145=SUCCESS). In step 1909, the Fixing Configuration Changes Analyzer 133 counts the number of records which meet the following condition by referring to the Fixing Configuration Changes Temp Table 145: (Configuration Item (step 1907)=Configuration Item in Table 145), AND (Change Type (step 1907)=Change Type in Table 145). In step 1910, the Fixing Configuration Changes Analyzer 133 inserts the record of the result into the Fixing Configuration Changes Table 147. The record includes the Configuration Item (step 1907), Change Type (step 1907), the number of SUCCESS records (result of step 1908), and the number of all related records (result of step 1909).

Figure 20:
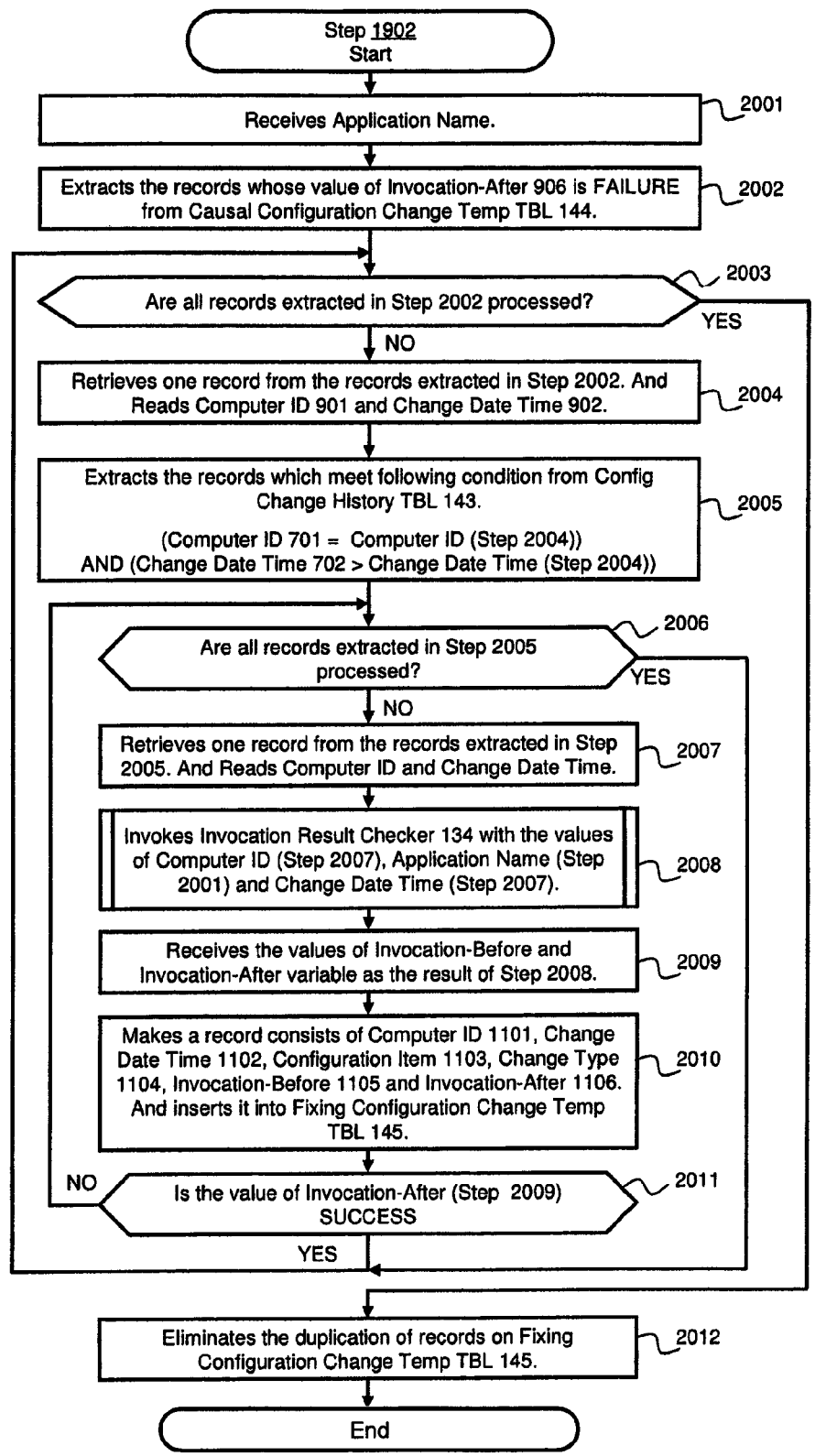
FIG. 20 is an example of a flow diagram illustrating the subroutine of the fixing configuration change analysis process of FIG. 19.

FIG. 20 is an example of a flow diagram illustrating the subroutine of the fixing configuration change analysis process in step 1902 of FIG. 19. This subroutine initiates the process by invocation from the Fixing Configuration Changes Analyzer 133. As illustrated in FIG. 20, in step 2001, this subroutine receives the Application Name as the parameter. In step 2002, this subroutine extracts the records whose value of Invocation-After 906 is FAILURE from the Causal Configuration Changes Temp Table 144.

In step 2003, this subroutine checks whether all records extracted in step 2002 are processed. If yes, the process proceeds to step 2012. If no, the process proceeds to step 2004. In step 2004, this subroutine retrieves one record from the records extracted in step 2002, and reads the Computer ID 901 and Change Date Time 902. In step 2005, this subroutine extracts the records which meet the following condition from the Configuration Change History Table 143: (Computer ID 701=Computer ID (step 2004)), AND (Change Date Time 702>Change Date Time (step 2004)).

In step 2006, this subroutine checks whether all records extracted in step 2005 are processed or not. If yes, the process proceeds to step 2003. If no, the process proceeds to step 2007. In step 2007, this subroutine retrieves one record from the records extracted in step 2005, and reads the Computer ID and Change Date Time. In step 2008, this subroutine invokes the Invocation Result Checker 134 with the values of the Computer ID (step 2007), Application Name (step 2001), and Change Date Time (step 2007). In step 2009, this subroutine receives the values of the Invocation-Before and Invocation-After variables as the result of step 2008. In step 2010, this subroutine makes a record including the Computer ID 1101, Change Date Time 1102, Configuration Item 1103, Change Type 1104, Invocation-Before 1105, and Invocation-After 1106. It inserts the record into the Fixing Configuration Changes Temp Table 145. In step 2011, this subroutine checks whether the value of the Invocation-After (step 2009)

is SUCCESS or not. If yes, the process returns to step 2003. If no, the process returns to step 2006. In step 2012, this subroutine eliminates the duplication of records on the Fixing Configuration Changes Temp Table 145.

B. Second Embodiment

FIG. 21 shows an example of the Causal Configuration Changes Table 146-21 according to a second embodiment of the invention. In the second embodiment, the Cause Analysis Program 121 reuses and displays the result which was analyzed and stored in the past if the same analysis was done in the past. In order to do this, the Causal Configuration Changes Table 146 of FIG. 10 needs to be expanded. In FIG. 21, the columns from 1001 to 1005 are the same as those in FIG. 10. Additionally, new columns for Application Name 2101 and Analyzed Date Time 2102 are introduced. For example, the record 2111 shows that the analysis was done for the Application Name "DOC EDITOR" at the Analyzed Date Time "06/05/2008 14:20:12." If the analysis condition is specified such that the Application Name is "DOC EDITOR" and the result of Target Period Detector 131 is the same, the Cause Analysis Program 121 can display the analysis result based on the Causal Configuration Changes Table 146-21. The same idea can be applied to the Fixing Configuration Change Table 147 of FIG. 12.

Figure 22:
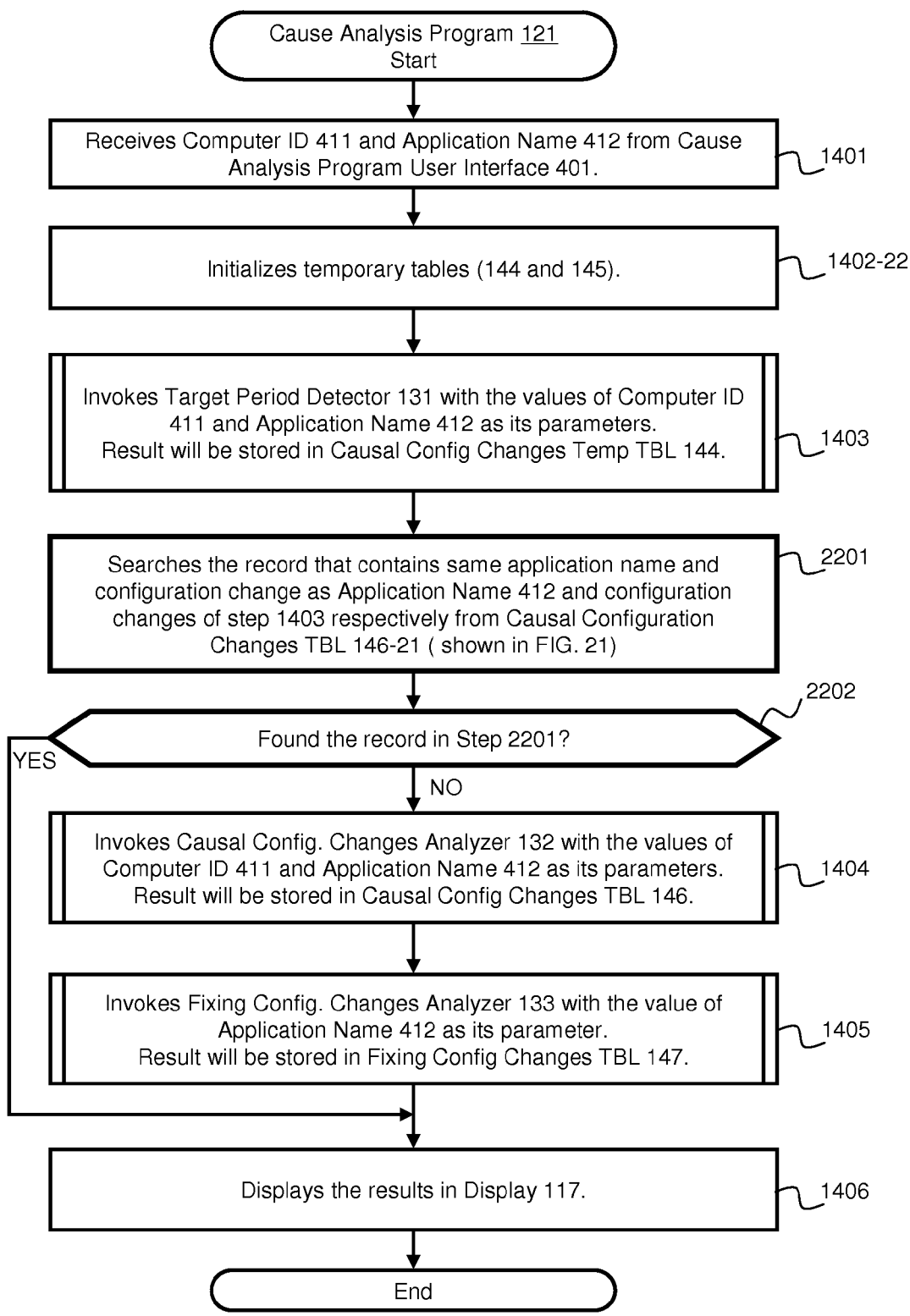
FIG. 22 is an example of a flow diagram illustrating causal analysis as executed by the Cause Analysis Program according to the second embodiment of the invention.

FIG. 22 is an example of a flow diagram illustrating causal analysis as executed by the Cause Analysis Program 121 according to the second embodiment of the invention. Steps 1401, 1403, 1404, 1405 and 1406 are the same as those in FIG. 14. The differences between FIG. 14 and FIG. 22 are as follows. In step 1402-22 (in place of step 1402), the Cause Analysis Program (121) does not initialize result tables (Causal Configuration Changes Table 146 and Fixing Configuration Change Table 147). In step 2201, the Cause Analysis Program 121 searches the record that contains the same application name and configuration change as the Application Name 412 and configuration changes of step 1403, respectively, from the Causal Configuration Changes Table 146-21 (shown in FIG. 21). In step 2202, the Cause Analysis Program 121 checks whether the record of the past result was found or not. If yes, the process proceeds to the step 1406. If no, the process proceeds to step 1404. The result that is stored in step 1404 should be based on the schema of the Causal Configuration Changes Table 146-21 (FIG. 21).

C. Third Embodiment

FIG. 23 shows an example of the Causal Configuration Changes Table 146-23 according to a third embodiment of the invention. In the third embodiment, the Cause Analysis Program 121 analyzes based on the combination of configuration changes. In order to do this, the Causal Configuration Changes Table 146 of FIG. 10 needs to be expanded. As seen in FIG. 23, the columns from 1001 to 1005 are the same as those in FIG. 10. Additionally, a new column for the Combination ID 2301 is introduced. There are records 2311-2317. For example, the record 2311 shows that the analysis was done by using all combinations of each configuration change. The same idea can be applied to expand the Fixing Configuration Change Table 147 of FIG. 12.

Figure 24:
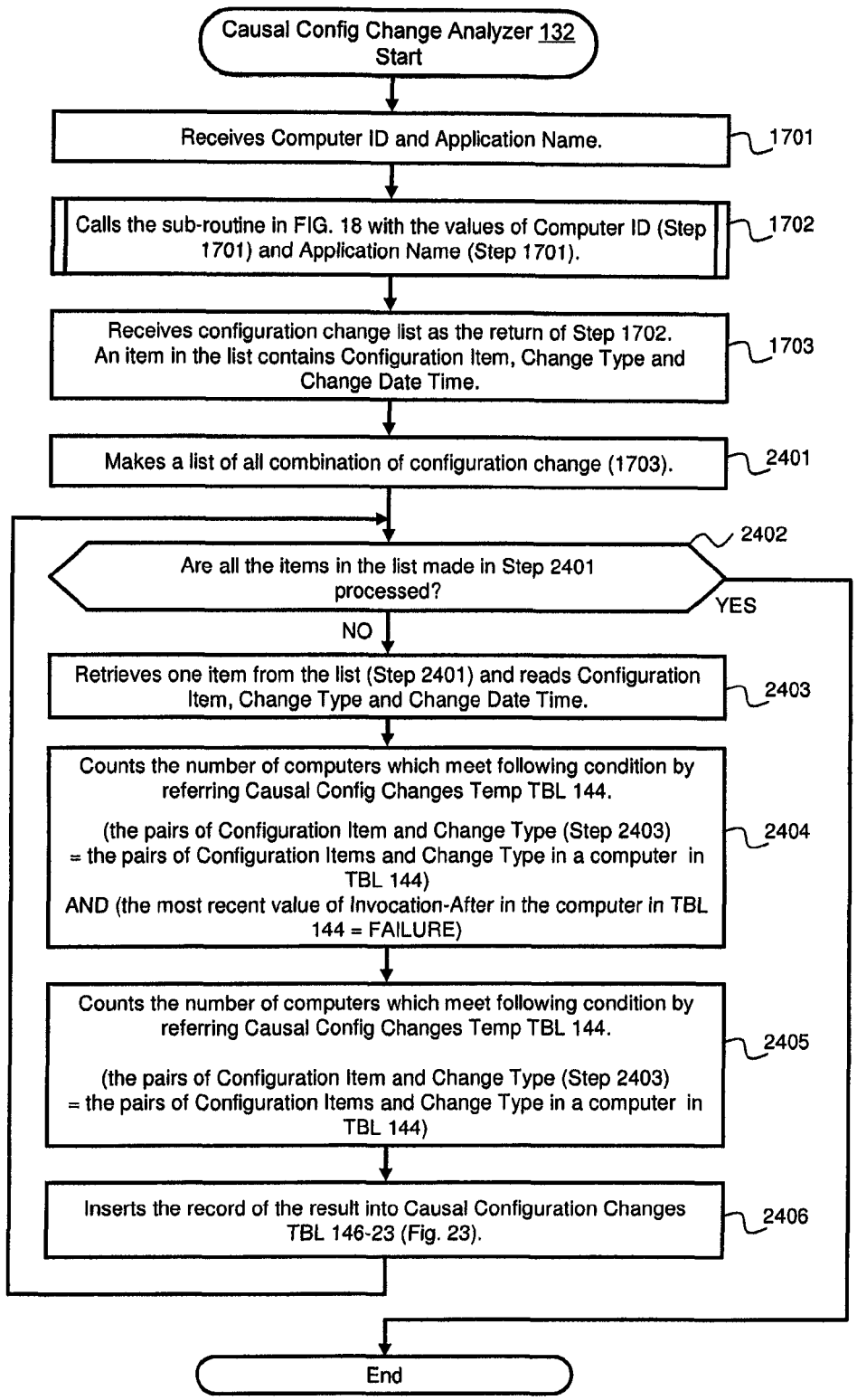
FIG. 24 is an example of a flow diagram illustrating the causal configuration change analysis process as executed by the Causal Configuration Changes Analyzer according to the third embodiment of the invention.

FIG. 24 is an example of a flow diagram illustrating the causal configuration change analysis process as executed by the Causal Configuration Changes Analyzer 132 according to the third embodiment of the invention. Step 1701, 1702 and 1703 are the same as those in FIG. 17. The differences between FIG. 17 and FIG. 24 are as follows. In step 2401, the Causal Configuration Change Analyzer 132 makes a list of all combinations of configuration changes 1703. When the configuration changes are "PRINTER DRIVER A—ADD," "VPN-CLIENT v2.0—ADD," and "VPN-CLIENT v1.8—REMOVE," the combination becomes the following:

"PRINTER DRIVER A—ADD", "VPN-CLIENT v2.0—ADD", "VPN—CLIENT v1.8—REMOVE"
"PRINTER DRIVER A—ADD", "VPN-CLIENT v2.0—ADD"
"PRINTER DRIVER A—ADD", "VPN-CLIENT v1.8—REMOVE"
"VPN-CLIENT v2.0—ADD", "VPN-CLIENT v1.8—REMOVE"
PRINTER DRIVER A—ADD"
"VPN-CLIENT v2.0—ADD"
"VPN-CLIENT v1.8—REMOVE"

In step 2402, the Causal Configuration Change Analyzer 132 checks whether all the items in the list made in step 2401 are processed or not. If yes, the process ends. If no, the process proceeds to the step 2403. In step 2403, the Causal Configuration Change Analyzer 132 retrieves one item from the list (step 2401) and reads the Configuration Item, Change Type, and Change Date Time. In step 2404, the Causal Configuration Change Analyzer 132 counts the number of computers which meet the following condition by referring to the Causal Configuration Changes Temp Table 144: (the pairs of Configuration Item and Change Type (step 2403)=the pairs of Configuration Items and Change Type in a computer in Table 144), AND (the most recent value of Invocation-After in the computer in Table 144=FAILURE). In step 2405, the Causal Configuration Change Analyzer 132 counts the number of computers which meet the following condition by referring to the Causal Configuration Changes Temp Table 144: (the pairs of Configuration Item and Change Type (step 2403)=the pairs of Configuration Items and Change Type in a computer in Table 144). In step 2406, the Causal Configuration Change Analyzer 132 inserts the record of the result into the Causal Configuration Changes Table 146-23 (FIG. 23).

D. Fourth Embodiment

Figure 25:
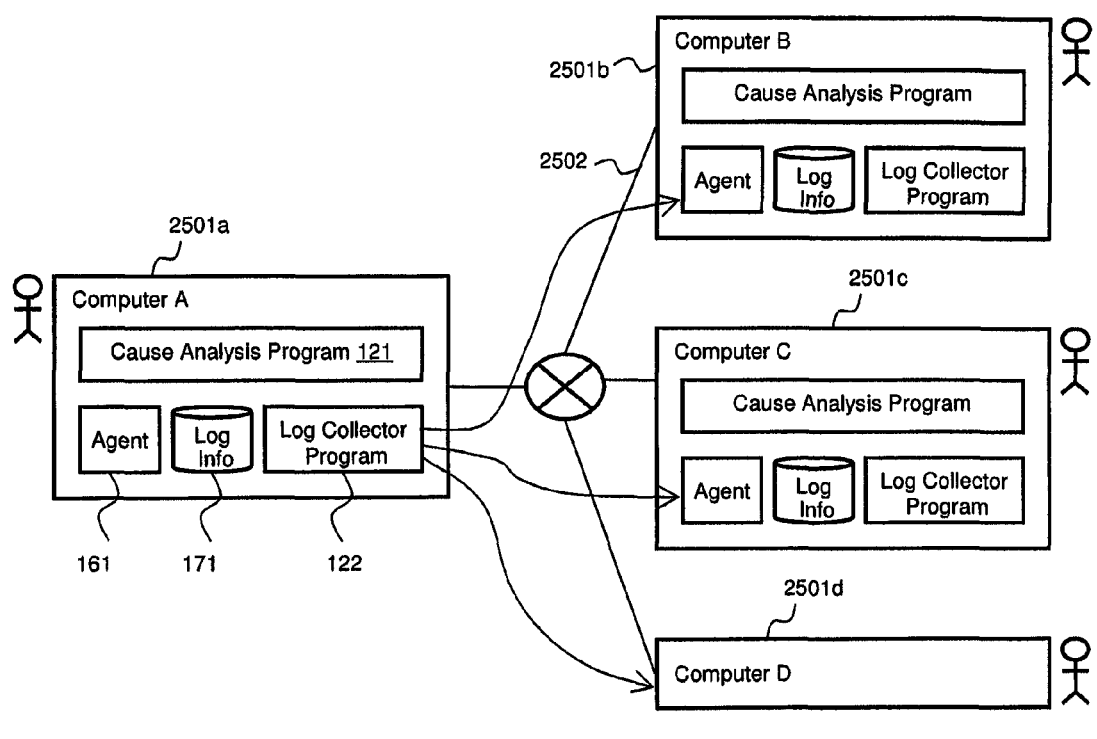
FIG. 25 illustrates an example of a configuration of hardware architecture, software modules, and tables of entire system according to a fourth embodiment of the invention.

FIG. 25 illustrates an example of a configuration of hardware architecture, software modules, and tables of entire system according to a fourth embodiment of the invention. In the fourth embodiment for peer-to-peer architecture, all of the computers can be server and client according to the situation. No centralized server is necessary. Each computer 2501 has the Cause Analysis Program (121), agent (161), Log Information (171), and Log Collector Program (122). The Log Information (171) in each computer contains not only Log Information of that computer but also Log Information of other computers.

Of course, the system configurations illustrated in FIGS. 1 and 2 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for finding a solution to an application failure by analyzing configuration changes without using a knowledge database. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:
   at least one first computer;
   a second computer; and
   an analysis computer coupled to the at least one first computer and the second computer,
   wherein the analysis computer is configured to:
   (A) store configuration change history indicating configuration changes of the at least one first computer;
   (B) store event log information indicating events related to a first object included in the at least one first computer;
   (C) identify a certain configuration change of the second computer and events related to the first object in the second computer; and
   (D) perform at least one of (1) causal configuration change analysis or (2) fixing configuration change analysis as follows:
   (1) as the causal configuration change analysis, calculate a rate of occurrence of a certain problem related to the first object regarding the certain configuration change, based on:
   (1-1) at least one configuration change of the at least one first computer, which at least has a same configuration item as the certain configuration change, and
   (1-2) at least one occurrence of the certain problem in the at least one first computer, after occurrence of the at least one configuration change of the at least one first computer;
   wherein the rate of the occurrence of the certain problem is calculated based on a ratio of a number of computers in which the certain problem occurs after the configuration change to a total number of computers related to the certain configuration change;
   (2) as the fixing configuration change analysis, calculate a rate of fixing the certain problem regarding the certain configuration change, based on:
   (2-1) at least one configuration change of the at least one first computer, which at least has a same configuration item as the certain configuration change, and
   (2-2) at least one event which is related to the first object included in the at least one first computer and indicates other than the certain problem, after occurrence of the at least one configuration change of the at least one first computer,
   wherein the rate of fixing the certain problem is calculated based on a ratio of a number of computers in which the at least one event, indicating other than the certain problem, occurs after the certain configuration change to a total number of computers related to the certain configuration change; and
   (E) display the rate of occurrence of the certain problem or the rate of fixing the certain problem regarding the certain configuration change.

2. The system according to claim 1,
   wherein the event related to the first object indicates invocation results of a first application executed by the at least one first computer or the second computer, and the at least one occurrence of the certain problem indicates failure of invocation of the first application.

3. The system according to claim 1,
   wherein the at least one configuration change of the at least one first computer further has a same change type as the certain configuration change.

4. An analysis computer comprising:
   a memory storing an analysis program; and
   a central processing unit executing the analysis program,
   wherein the analysis program causes the analysis computer to:
   (A) store configuration change history indicating configuration changes of at least one first computer;
   (B) store event log information indicating events related to a first object included in the at least one first computer;
   (C) identify a certain configuration change of a second computer and events related to the first object in the second computer, wherein the second computer is different from the at least one first computer; and
   (D) perform at least one of (1) casual configuration change analysis or (2) fixing configuration change analysis as follows:

(1) as the causal configuration change analysis, calculate a rate of occurrence of a certain problem related to the first object regarding the certain configuration change, based on:
  (1-1) at least one configuration change of the at least one first computer, which at least has a same configuration item as the certain configuration change, and
  (1-2) at least one occurrence of the certain problem in the at least one first computer, after occurrence of the at least one configuration change of the at least one first computer,
wherein the rate of the occurrence of the certain problem is calculated based on a ratio of a number of computers in which the certain problem occurs after the configuration change to a total number of computers related to the certain configuration change;
(2) as the fixing configuration change analysis, calculate a rate of fixing the certain problem regarding the certain configuration change, based on:
  (2-1) at least one configuration change of the at least one first computer, which at least has a same configuration item as the certain configuration change, and
  (2-2) at least one event which is related to the first object included in the at least one first computer and indicates other than the certain problem, after occurrence of the at least one configuration change of the at least one first computer,
wherein the rate of fixing the certain problem is calculated based on a ratio of a number of computers in which the at least one event, indicating other than the certain problem, occurs after the certain configuration change to a total number of computers related to the certain configuration change; and
(E) display the rate of the occurrence of the certain problem or the rate of fixing the certain problem regarding the certain configuration change.

5. The analysis computer according to claim 4,
wherein the event related to the first object indicates invocation results of a first application executed by the at least one first computer or the second computer, and the at least one occurrence of the certain problem indicates failure of invocation of the first application.

6. The analysis computer according to claim 4,
wherein the at least one configuration change of the at least one first computer further has a same change type as the certain configuration change.

\* \* \* \* \*